(12) United States Patent
Swain et al.

(10) Patent No.: US 10,244,070 B2
(45) Date of Patent: Mar. 26, 2019

(54) IN-MEMORY MESSAGE SEQUENCING

(71) Applicant: Oracle International Corporation, Redwood Shores, CA (US)

(72) Inventors: Sanjib Kumar Swain, Bangalore (IN); Prasanna Chandrashekhara, Bangalore (IN); Eng Keat Khor, San Jose, CA (US); Senthilnathan Swaminathan, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 15/006,963

(22) Filed: Jan. 26, 2016

(65) Prior Publication Data
US 2017/0214762 A1 Jul. 27, 2017

(51) Int. Cl.
*H04L 29/08* (2006.01)
*H04L 12/863* (2013.01)
(Continued)

(52) U.S. Cl.
CPC .......... *H04L 67/2842* (2013.01); *G06F 9/546* (2013.01); *G06F 15/167* (2013.01); *H04L 47/50* (2013.01); *H04L 51/26* (2013.01)

(58) Field of Classification Search
CPC ..... H04L 67/2842; H04L 47/50; H04L 51/26; H04L 47/621; G06F 15/167; G06F 9/546; G06F 11/2064; G06F 11/2074
See application file for complete search history.

(56) References Cited

U.S. PATENT DOCUMENTS 6,052,363 A 4/2000 Koch
6,529,932 B1 * 3/2003 Dadiomov ............. G06F 9/466
709/201
(Continued)

FOREIGN PATENT DOCUMENTS

EP 2811437 12/2014

OTHER PUBLICATIONS

Birman-Schiper-Stephenson Protocol, Available online at: http://www.scribd.com/fullscreen/50939999?access_key=key-1Ln7iwvlgjx9clye6hyo&allow share=true&escape=false&view mode=scroll, last modified on Feb. 17, 2000, pp. 1-10; downloaded link on Mar. 1, 2018.
(Continued)

*Primary Examiner* — Chris Parry
*Assistant Examiner* — Chouat Abderrahmen
(74) *Attorney, Agent, or Firm* — Kilpatrick Townsend & Stockton LLP

(57) ABSTRACT

The present disclosure relates generally to techniques for facilitating reliable communication of messages between a source system (e.g., a client system) and a destination (e.g., a target system) via an intermediary messaging system. In certain embodiments, the intermediary messaging system receives messages to be sent to a target system. A plurality of entries corresponding to the messages are added in memory queued corresponding to the target system. A signal is received that the message is ready for transmission. The memory queues of the target system are accessed and a determination is made from the memory queues that no other message for the target system needs to be transmitted before the message. The message is transmitted after all messages that have to be transmitted prior to the first message are transmitted.

15 Claims, 14 Drawing Sheets

(51) Int. Cl.
*H04L 12/58* (2006.01)
*G06F 15/167* (2006.01)
*G06F 9/54* (2006.01)

(56) References Cited

U.S. PATENT DOCUMENTS

| | | | |
|---|---|---|---|
| 6,816,458 B1* | 11/2004 | Kroon | H04L 47/10 |
| | | | 370/235 |
| 7,020,149 B1* | 3/2006 | Hellwig | H04L 47/10 |
| | | | 370/412 |
| 7,580,979 B2 | 8/2009 | Flaherty et al. | |
| 8,015,256 B2 | 9/2011 | Pacheco | |
| 8,023,408 B2 | 9/2011 | Herrmann | |
| 8,200,765 B2 | 6/2012 | Bittles et al. | |
| 8,218,549 B2 | 7/2012 | Dekel et al. | |
| 8,364,743 B2 | 1/2013 | Parkinson et al. | |
| 9,038,093 B1* | 5/2015 | Leonard | G06F 9/546 |
| | | | 719/314 |
| 9,223,700 B2* | 12/2015 | Aronovich | G06F 17/30115 |
| 9,262,241 B2 | 2/2016 | Giannone et al. | |
| 9,665,840 B2 | 5/2017 | Swaminathan et al. | |
| 2005/0025152 A1* | 2/2005 | Georgiou | H04L 47/10 |
| | | | 370/394 |
| 2005/0154804 A1* | 7/2005 | Stewart | G06F 13/4022 |
| | | | 710/36 |
| 2007/0067471 A1 | 3/2007 | Wolfe et al. | |
| 2007/0118601 A1 | 5/2007 | Pacheco | |
| 2008/0148275 A1 | 6/2008 | Krits et al. | |
| 2008/0201712 A1 | 8/2008 | Nottingham et al. | |
| 2009/0144385 A1 | 6/2009 | Gold | |
| 2010/0005147 A1 | 1/2010 | Johnson, III et al. | |
| 2010/0257240 A1 | 10/2010 | Singh et al. | |
| 2010/0303073 A1 | 12/2010 | Kubo et al. | |
| 2011/0282949 A1 | 11/2011 | Rivkin | |
| 2012/0047518 A1 | 2/2012 | Parkinson et al. | |
| 2013/0034039 A1 | 2/2013 | Wong et al. | |
| 2013/0081063 A1 | 3/2013 | Hosie et al. | |
| 2013/0258860 A1 | 10/2013 | King et al. | |
| 2014/0280457 A1* | 9/2014 | Anton | G06Q 40/08 |
| | | | 709/202 |
| 2015/0271253 A1 | 9/2015 | Swaminathan et al. | |

OTHER PUBLICATIONS

Channel Message Sequence Numbering, Available online at: http://publib.boulder.ibm.com/infocenter/wmqv7/v7r0/index.jsp?topic=%2Fcom.ibm.mq.sqzae.doc%2Fic11080.htm, Oct. 1, 2013, pp. 1-2; downloaded link on Mar. 1, 2018.

Message Sequencing, Available online at: http://publib.boulder.ibm.com/infocenter/wmbhelp/v7r0m0/index.jsp?topic=%2Fcom.ibm.etools.mft.doc%2Fbc28020.htm, Nov. 26, 2014, pp. 1-3; downloaded link on Mar. 1, 2018.

Using Message Unit-of-Order, Available online at: https://docs.oracle.com/cd/E12840_01/wls/docs103/jms/uoo.html, Nov. 26, 2014, pp. 1-7; downloaded link on Feb. 26, 2018.

Birman et al., Fast Causal Multicast, Department of Computer Science, Cornell University, Apr. 10, 1990, pp. 1-34.

Schiper et al., A New Algorithm to Implement Causal Ordering, Distributed Algorithms, WDAG 1989, Lecture Notes in Computer Science, vol. 392, Available online at: https://link.springer.com/chapter/10.1007/3-540-51687-5_45#page-1, Jun. 2, 2005, pp. 219-232.

Singhal et al., Casual Order of Messages, Available online at: http://courses.cs.vt.edu/~cs5204/fall00/causal.html, updated Feb. 21, 1995, pp. 1-2; downloaded link on Mar. 1, 2018.

Ward, Algorithms for Causal Message Ordering in Distributed Systems, Available online at: http://citeseerx.ist.psu.edu/viewdoc/download?doi=10.1.1.92.1137&rep=rep1&type=pdf, Feb. 17, 2014, pp. 1-17.

* cited by examiner

IN-MEMORY MESSAGE SEQUENCING

BACKGROUND OF THE INVENTION

The present disclosure relates to computer systems and software, and more particularly to techniques for facilitating message delivery between service requestors and service providers.

Messages are typically used for electronic coordination of various activities in different subsystems of an enterprise system. An enterprise system may receive messages from different subsystems, process the messages and deliver the messages to appropriate target destinations for appropriate actions to be taken by the target destinations.

During an exchange of messages between a service requester (e.g., a source system) and a service provider (e.g., a target destination), messages may typically be delivered to a target destination in a desired sequence, such as, for instance, based on the order in which the messages were received from the source system. There is often a need to ensure that a desired message sequence is maintained and/or restored in the target destination in a reliable and robust matter. As such, improved ways of facilitating message delivery between service requestors and service providers continues to be a priority.

BRIEF SUMMARY OF THE INVENTION

Techniques are provided (e.g., a method, a system, non-transitory computer-readable medium storing code or instructions executable by one or more processors) for facilitating reliable information exchange between service requesters and service providers. In certain embodiments, an intermediary messaging system is provided that facilitates the reliable exchange of information between one or more source systems and one or more target systems provided by the service providers.

In certain embodiments, an intermediary messaging system is provided that is capable of receiving a first plurality of messages to be sent to a first target system. In some examples, the first plurality of messages may include at least a first message and a second message. The intermediary messaging system adds a plurality of entries corresponding to the first plurality of messages in a memory queue corresponding to the first target system. In an embodiment, an order of the plurality of entries in the memory queue is based at least in part on an order of receipt of the first plurality of messages. The intermediary messaging system receives a signal that the first message is ready for transmission and accesses the memory queue for the first target system. The intermediary messaging system then determines from the memory queue that no other message for the first target system needs to be transmitted before the first message. The intermediary messaging system then transmits the first message after all messages that have to be transmitted prior to the first message are transmitted.

In some embodiments, the intermediary messaging system is capable of processing the first plurality of messages. An order of processing of the first plurality of messages may be independent of the order of receipt of the first plurality of messages to the intermediary messaging system. In an embodiment, the intermediary messaging system is capable of processing the first plurality of messages in parallel.

In some embodiments, the memory queue may include a message sequencing queue and a message status queue corresponding to the first target system. In an embodiment, the message sequencing queue and the message status queue are stored in a shared memory cache of the computing system. In some examples, the shared memory cache may be implemented and/or provided by one or more Coherence caches.

In some embodiments, the intermediary messaging system is capable of receiving a second plurality of messages to be sent to a second target system. In some examples, the second plurality of messages may include at least a third message and a fourth message. The intermediary messaging system is capable of adding a plurality of entries corresponding to the second plurality of messages in a memory queue corresponding to the second target system. In an embodiment, an order of the plurality of entries in the memory queue is based at least in part on an order of receipt of the second plurality of messages to the intermediary messaging system. The intermediary messaging system is capable of receiving a signal that the third message is ready for transmission. The intermediary messaging system then accessing the memory queue for the second target system. The intermediary messaging system is capable of determining from the memory queue that no other message for the second target system needs to be transmitted before the third message. Then, in some embodiments, the intermediary messaging system is capable of transmitting the third message after all messages that have to be transmitted before the third message are transmitted.

In certain embodiments, an order of processing of the first plurality of messages to be sent to the first target system and the second plurality of messages to be sent to the second target system is independent of an order of receipt of the first plurality of messages and the second plurality of messages.

In certain embodiments, the intermediary messaging system is capable of determining from the memory queue that at least one other message for the first target system needs to be transmitted before the first message. The intermediary messaging system is capable of adding a plurality of entries corresponding to the first message in a dispatch queue associated with the target system. Then, in some embodiments, the intermediary messaging system is capable of transmitting the first message after the at least one other message for the first target system has been transmitted to the first target system.

In certain embodiments, the intermediary messaging system is capable of determining that a message in the first plurality of messages is to be sent to multiple target systems. In some examples, the multiple target systems may include at least the first target system and a second target system. The intermediary messaging system is capable of adding a plurality of entries corresponding to the message in the memory queue corresponding to the first target system and adding the plurality of entries corresponding to the message in a memory queue corresponding to the second target system.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION OF THE INVENTION

Figure 1:
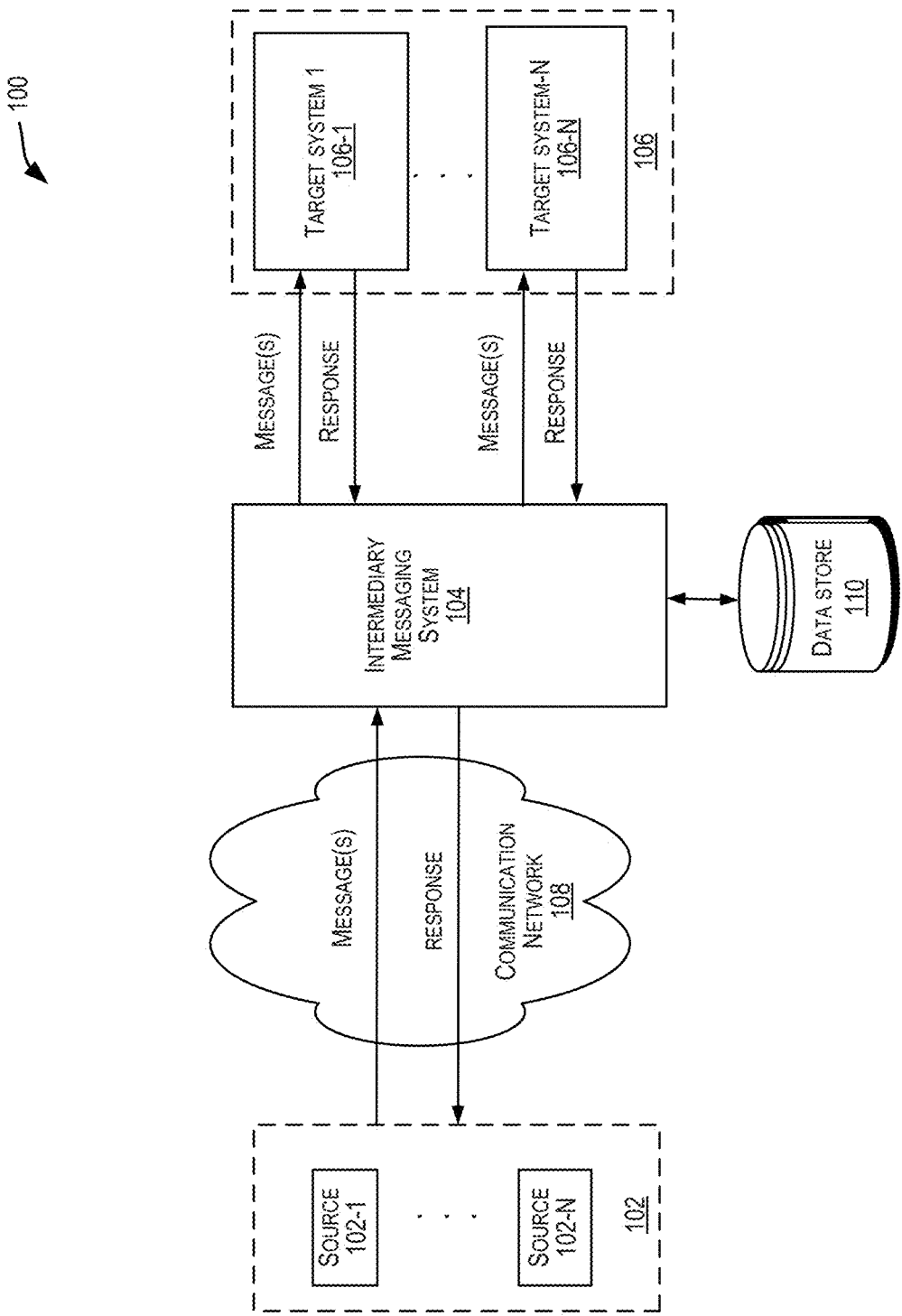
FIG. 1 illustrates an example block diagram of a computing environment in accordance with certain embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

The present disclosure relates generally to techniques for improving reliability of message communications. In certain embodiments, techniques are described for facilitating reliable communication of messages between a source system (e.g., a client system) and a destination (e.g., a target system) via an intermediary messaging system. The messages may be communicated to request, for example, a target service or a resource, from the destination.

In certain embodiments, an intermediary messaging system is disclosed that is capable of facilitating reliable communication of messages between source systems and target systems. The intermediary messaging system receives messages from one or more source systems and identifies target destinations for the messages. For each received message, the intermediary messaging system adds a plurality of entries associated with the message to a memory queue corresponding to a target destination for the message. Thus, for instance, if the intermediary messaging system receives a message that is destined to a target system T1, then the intermediary messaging system adds a plurality of entries associated with the message to a memory queue corresponding to T1. In some examples, the plurality of entries may include information associated with a message, such as the message payload, a message identifier, a sequence number, message status information such as the delivery status of a message, and the like. In an embodiment, the intermediary messaging system is capable of creating separate memory queues, wherein each memory queue is capable of storing information related to messages that are destined to particular target destinations.

In certain embodiments, the memory queues may be implemented in a shared memory cache of the intermediary messaging system. In an embodiment, the shared memory cache may include one or more distributed caches that may be implemented as Coherence caches. In some embodiments, the memory queues may be capable of storing a set of sequencing entries associated with the messages and status information related to the messages. In certain embodiments, the memory queues are capable of storing messages that are destined to a particular target destination in the order in which they were received by the intermediary messaging system.

In some embodiments, the intermediary messaging system is capable of processing the messages that it receives from the source systems in any order. That is, the order in which the intermediary messaging system receives messages from the source systems is not necessarily the order in which the intermediary messaging system may process the messages.

In certain embodiments, the intermediary messaging system is capable of dispatching the processed messages to their appropriate target destinations. Upon receiving a signal that a particular message is ready to be dispatched to a particular target system, the intermediary messaging system determines from the memory queue corresponding to the message that no other message for the target system needs to be transmitted before the message. If no other message for the target system needs to be transmitted before the message, then the intermediary messaging system transmits the message after all messages that have to be transmitted prior to the first message are transmitted. If the intermediary messaging system determines from the memory queue that at least one other message for the target system needs to be transmitted before the message, then the intermediary messaging system adds a plurality of entries corresponding to the message in a dispatch queue associated with the target system and transmits the message after the at least one other message for the target system has been transmitted to the target system. Thus, the intermediary messaging system ensures that the messages destined to a particular target system are transmitted to the target system in the order or sequence in which they were received by the intermediary messaging system.

By storing information related to messages in-memory using memory queues for each target system as disclosed above, the cost and time involved in acquiring and identifying a new target (e.g., by making roundtrips to a database) each time a message is received to the intermediary messaging system can be minimized. Additionally, by creating queues to store information related to the messages destined to different target systems in memory, the sorting overhead involved in indexing and sorting entries in a database based on timestamps to obtain information related to messages destined to a target system can be minimized.

Additional details of the manner in which the intermediary messaging system may process messages is discussed in relation to FIGS. 1-11 below.

FIG. 1 illustrates an example block diagram of a computing environment 100 in accordance with certain embodiments of the present invention. As shown, computing environment 100 includes one or more source systems 102(1)-102(N) (collectively, source systems 102) communicatively coupled to an intermediary messaging system 104 providing intermediary messaging services via a communication network 108. Intermediary messaging system 104 is also communicatively coupled with one or more target systems such as target systems 106(1) . . . 106(N) (collectively, target systems 106). While not shown in FIG. 1, intermediary messaging system 104 may be communicatively coupled to the target systems using one or more communication networks. Environment 100 may also include one or more data stores 110 that are accessible by intermediary messaging system 104. Data stores 110 can be implemented using a database (e.g., a document database, a relational database, or other type of database), a file store, a combination thereof, or some other information store. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

Source systems 102 may include one or more computing systems. Source systems 102 may be implemented in hardware, firmware, software, or combinations thereof. Source systems 102 may include a personal digital assistant (PDA), a tablet computer, a laptop computer, a desktop computer, a wearable computer, a pager, etc. Source systems 102 can include one or more memory storage devices and one or more processors. A memory storage device can be accessible to the processor(s) and can include instructions stored thereon which, when executed by the processor(s), cause the processor(s) to implement one or more operations disclosed herein. In some embodiments, source systems 102 may be configured to execute and operate applications such as a web browser, proprietary client applications, or the like.

Communication network 108 facilitates communications between one or more source systems 102 and intermediary messaging system 104. Communication network 108 can be of various types and can include one or more communication networks. For example, communication network 108 can include, without limitation, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as WebSockets that provide a full-duplex communication channel over a single TCP connection, IEEE 802.XX suite of protocols, TCP/IP, IPX, SAN, AppleTalk, Bluetooth, and other protocols. In general, communication network 108 may include any communication network or infrastructure that facilitates communications between one or more source systems 102 and intermediary messaging system 104.

Target systems 106 may be implemented or included in a computing system. Target systems 106 may be implemented in hardware, firmware, software, or combinations thereof. Target systems 106 may communicate with source systems 102 via intermediary messaging system 104. For example, messages created at the source systems may identify one or more of the target systems as destinations of the messages. A target system, which is the destination for a message, may receive the message sent from the source system via intermediary messaging system 104 and may communicate one or more responses to the source systems. The message may indicate a target service that is being requested. In some embodiments, one or more of the messages can be a web message intended for communication between the source systems and the target systems via communication network 108.

Target systems 106 can provide a variety of services in response to receiving messages requesting a service. The services may include executing an application, performing a function, retrieving of data, communicating information, or the like. Target systems 106 may be implemented in a computing device, such as a PDA, a tablet computer, a laptop computer, a desktop computer, a wearable computer, a pager, etc. Target systems 106 can be implemented using one or more memory storage devices and one or more processors. A memory storage device can be accessible to the processor(s) and can include instructions stored thereon which, when executed by the processor(s), cause the processor(s) to implement one or more operations disclosed herein. In various embodiments, target systems 106 may be configured to execute and operate applications (e.g., a web browser, proprietary client applications, or the like) to provide a service.

In some embodiments, a message communicated to a target system (e.g., 106-1) may be generated by an application executed at a source system (e.g., 102-1). For example, an application executing at the source system may send the message to the target system, via intermediary messaging system 104, for operation of the application, such as a request to perform an action using the target system. For example, the source system can be a loan application, which communicates a message to request a service from the target system to locate a customer's credit rating. In another example, the client application can be a web browser that communicates a message using a simple object access protocol (SOAP) to request a resource provided by the target system. In some embodiments, the source system executes an application that communicates the message to the target system, which is executing a different application. In some embodiments, both applications may use web services reliable messaging (WS-RM) protocol for the communications.

Intermediary messaging system 104 can act as a communication proxy service between source systems 102 and target systems 106. Rather than communicating directly with target systems 106 to deliver messages, source systems 102 may communicate messages to intermediary messaging system 104 for delivery of the messages to the target systems. Intermediary messaging system 104 can receive messages from source systems 102 to be communicated to one or more of systems 106. Intermediary messaging system 104 can receive one or more responses from a target system (e.g., 106-1) to be communicated to a source system (e.g., 102-1). For example, a response received from a target system may include information indicative of the delivery status of the message sent to the target system, such as whether the message was received or not received by the target system. As another example, the message may include information related to a service requested in the message.

By communicating via intermediary messaging system 104, source systems 102 and target systems 106 are able to ascertain reliable information regarding delivery status of a message from a source to a destination. Intermediary messaging system 104 may provide the source systems 102 and the target systems 106 with information indicating a delivery status of communicated messages. Intermediary messaging system 104 may enable reliable delivery of messages where the communication protocol(s) used by the source systems or the target systems may not provide mechanisms for ensuring delivery of messages, transmissions, acknowledgements, etc.

Intermediary messaging system 104 may be implemented using one or more computing devices, such as one or more server computers. In some embodiments, intermediary messaging system 104 can include multiple server computers, such as a source server computer and a destination server computer. In certain embodiments, one or both of the source server computer or the destination server computer can be a network communication server computer. The source server computer may be configured to process messages received from source systems 102 to send to target systems 106. Messages may be processed according to a protocol supported by the source systems. The destination server computer may handle delivery of messages processed by the source server computer. The destination server computer may be configured to deliver messages to a destination, such as one of the target systems 106. In some embodiments, one or both of the source server computer or the destination server computer can operate as an application server that enables applications and services to be provided to one or both of the source systems and the target systems.

Intermediary messaging system 104 can include one or more memory storage devices and one or more processors. A memory storage device can be accessible to the processor(s) and can include instructions stored thereon which, when executed by the processor(s), cause the processor(s) to implement one or more operations disclosed herein. In various embodiments, the intermediary messaging system 104 may be configured to execute and operate a service application such as a web browser, proprietary client applications, or the like.

In some embodiments, exchange of messages between source systems 102 and target systems 106 may be facilitated by one or more of the server computers in the intermediary messaging system. For example, when a message is communicated from a source system 106-1 to the target system 106-1 using the WS-RM protocol, the source server computer may be configured to operate as a reliable messaging source (RMS) and the destination server computer may be configured to operate as reliable messaging destination (RMD) to facilitate the exchange of the message according to the WS-RM protocol. The source server computer can communicate with the destination server computer to manage communication of messages. Managing communication of messages may include maintaining a sequence of communication for messages to be delivered. In one embodiment, QoS parameters may be defined (e.g., defined by the protocol itself, defined by a system administrator, etc.) for the message delivery. In such an embodiment, the source server computer and the destination server computer may be configured to ensure delivery of messages according to and in compliance with the QoS parameters of the message communication protocol (e.g., WS-RM protocol).

In some embodiments, intermediary messaging system 104 can include or implement an enterprise service bus. One or more disparate computing systems, such as source systems 102 and target systems 106 can be communicatively connected through the enterprise service bus. The enterprise service bus can monitor and control routing of messages between source systems 102 and target systems 106. The enterprise service bus can control access to the target systems including contention resolution between multiple sources for communication with a target system. The enterprise service bus can perform event handling, data transformation for messages being communicated, and message protocol conversion.

The enterprise service bus can support a variety of different communication protocols among others including SOAP, Hypertext Transfer Protocol (HTTP), Java Messaging Service (JMS) protocols, Java Remote Method Invocation interface over the Internet Inter-Orb Protocol (RMI-IIOP), electronic mail communication protocols (e.g., Simple Mail Transfer Protocol), File Transfer Protocol (FTP), WS-RM protocol, any of which can be implemented by the source systems and/or the target systems for communication. In certain embodiments, for a message originated at a source and destined for a particular target, the communication protocol used for communications between the source and intermediary messaging system 104 may be different from the communication protocol used for communications between intermediary messaging system 104 and the particular target. In such a scenario, a message received by intermediary messaging system 104 from a source system 102-1 for delivery to a destination, such as 106-1 may be received by intermediary messaging system 104 in a first format according to a first communication protocol. Intermediary messaging system 104 may then convert the received message to a second format that is different from the first format and communicate the converted message to the intended destination according to a second communication protocol supported by the destination, where the second communication protocol is different from the first communication protocol.

In some embodiments, intermediary messaging system 104 may include a shared memory cache subsystem that may be implemented by one or more cache servers. In an embodiment, the cache servers are capable of storing messages communicated via intermediary messaging system 104 from source systems 102 to target systems 106. The cache servers may also store information for each distinct message communicated via intermediary messaging system 104. In an embodiment, the cache servers may include or implement one or more distributed caches. The distributed caches may be capable of storing a collection of data that can be distributed or partitioned across a cluster of nodes (processors) such that exactly one node in a cluster is responsible for each piece of data in the cache, and the responsibility is distributed (or, load-balanced) among the cluster nodes. In an embodiment, the distributed caches may be implemented as Coherence caches. As described herein, a Coherence cache may refer to an in-memory data grid solution provided by Oracle® corporation to store data from multiple servers.

In an embodiment, the Coherence caches may store sequencing information and status information associated with the messages received to intermediary messaging system 104. In certain embodiments, and as will be discussed in detail in relation to FIG. 2 below, the Coherence caches may reliably manage the information related to messages stored in-memory by automatically and dynamically partitioning the information destined to the individual target systems in individual nodes of the distributed caches.

In some embodiments, the stored information associated with a message may include the message payload (i.e., the actual content of the message) and transport information associated with the message such as a unique message identifier for the message or other information about the status of the message. The message identifier of a message may be used as the unique message identifier for the message. By storing the message identifier of the message, intermediary messaging system 104 can determine whether any new messages are duplicates of messages that are pending delivery. In certain embodiments, the content of the messages (i.e., the message payload) may also be stored in data store 110. Data store 110 may facilitate or enable system recovery of messages that were in the process of being communicated. In some embodiments, data store 110 can be implemented as a database, an intermediate cache, an in-memory storage or any other persistent storage.

For each message identifier, the associated stored information may also include information indicative of the delivery status of the message corresponding to the message identifier to the message's intended destination. For example, for a message received by intermediary messaging component 104 from a source system 102-1, intermediary messaging component 104 may store a message identifier for the message and also store information regarding the delivery status of the message to its intended destinations (i.e., target systems 106). This delivery status information may be updated as intermediary messaging component 104 receives information about a change in the delivery status (e.g., from "communication pending" to "message received by target"). In certain embodiments, a separate message identifier may be stored in association with a message identifier or other identifier associated with delivery of a message to a destination by the intermediary messaging component. The message identifier may be used by the intermediary messaging component to manage retries for delivery of a message corresponding to the message identifier. The message identifier used by the intermediary messaging component may be stored in association with a delivery status of a message.

Various different techniques may be used to generate a message identifier for a message. In one embodiment, the message identifier for a message may be generated based upon portions of the contents of the message. For example, a portion of the message may be selected and a message identifier generated by applying a function to the selected portion. In another example, the message identifier may correspond to information already contained in a received message. In another embodiment, a sequence number scheme may be used to generate the message identifiers. In one such embodiment, intermediary messaging component 104 may keep track of a sequence of communications between a source system and a target system and assign a message identifier to a message based upon the order of the message in the sequence of communications.

Message identifiers may be used for various different purposes by intermediary messaging component 104. For example, in one embodiment, the intermediary messaging component may use message identifiers to identify duplicate messages. The intermediary messaging component may search data store 110 for a message identifier to determine whether a message identifier is already stored. The existence of a message identifier may indicate that a request was received for delivery of a message associated with the message identifier. The existence of a message identifier may be useful to determine whether a new requested message is a duplicate. The determination of whether a message is an original message or a duplicate message may trigger one or more different actions related to delivery of a message by intermediary messaging component 104. For example, if a message is determined to be a duplicate, intermediary messaging component 104 may determine the delivery status associated with the original message and based upon the delivery status determine whether or not to permit communication of the duplicate message.

Intermediary messaging component 104 can store a delivery status of the messages communicated between source systems 102 and target systems 106. The delivery status can be stored in association with the message identifier. The delivery status can indicate whether the message has been delivered (e.g., an acknowledgement of delivery has been received), whether the message has been sent, whether an error has been encountered during delivery of the message, or other status associated with delivery of the message. The intermediary messaging component can include an interface that enables the intermediary messaging component 104 notify a user about a change in the delivery status of a message.

In certain embodiments, intermediary messaging component 104 can determine the delivery status based on the message identifier for a message. The delivery status can be used by the intermediary messaging component to determine whether a message is a duplicate of a previously message. The intermediary messaging component can use the delivery status to determine whether a duplicate message was has been sent to one or more of the target systems 106. In some embodiments, the intermediary messaging component can determine whether a duplicate message should be communicated to the target systems, and if not, prevent duplicate messages from being communicated to the target systems. The status of communication (e.g., delivery status of a message) for the messages can enable the intermediary messaging component 104 manage communication within the system. For example, the intermediary messaging component 104 can attempt to retry delivery of the message to one of the target systems 106 by resending the message.

Figure 2:
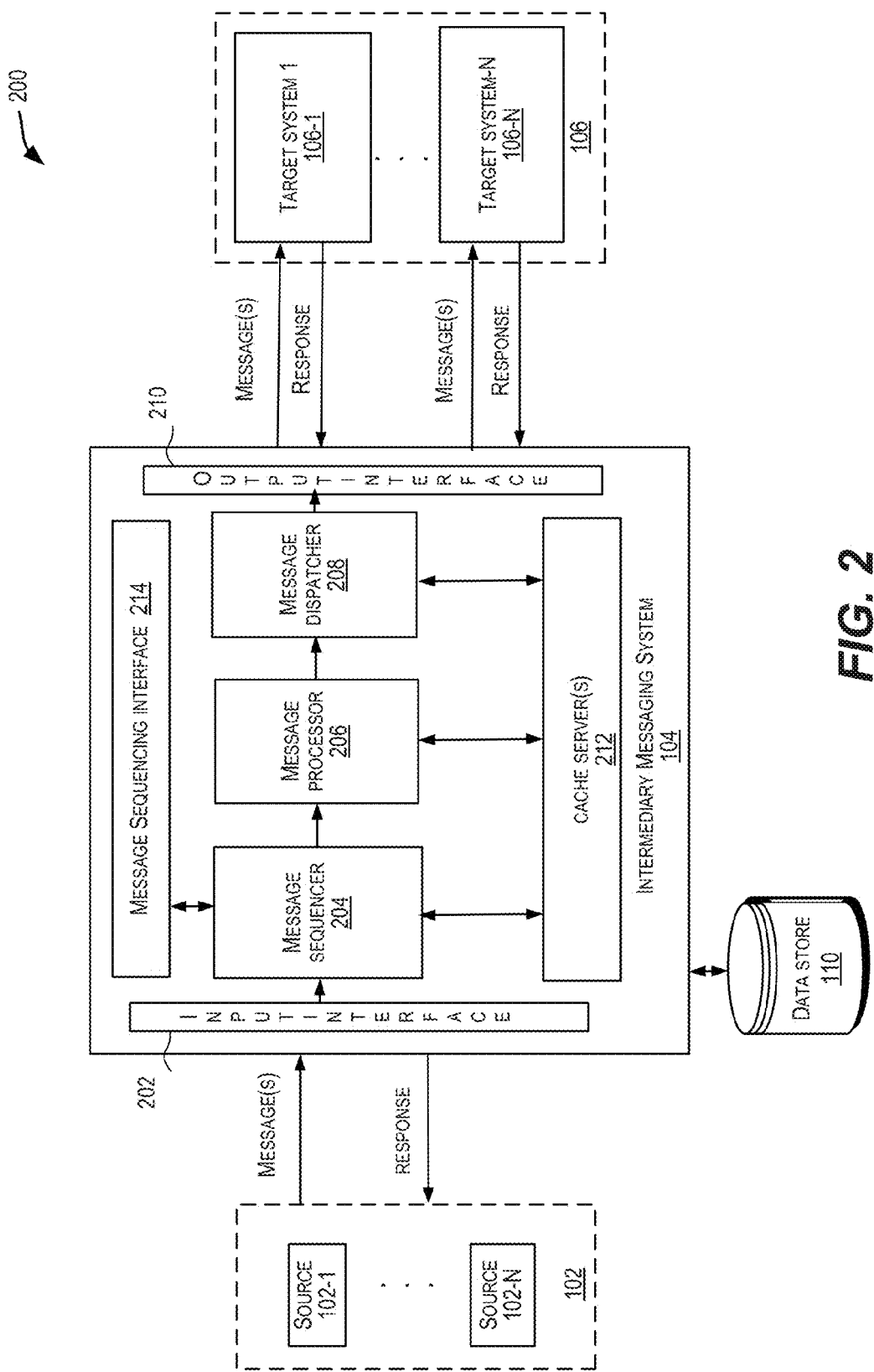
FIG. 2 depicts a simplified high-level diagram of an environment of an intermediary messaging system according an embodiment of the present invention.

The intermediary messaging system 104 is described further below with reference to FIG. 2. FIG. 2 depicts a simplified high-level diagram of an environment 200 of an intermediary messaging system according an embodiment of the present invention. Computing environment 200 can include like elements of FIG. 1 represented by like reference numbers and designations. For instance, computing environment 200 can include one or more source systems 102, one or more target systems 106, intermediary messaging system 104, and data store 110. As noted above, intermediary messaging system 104 can facilitate reliable communication of messages (e.g., web messages) between source systems 102 and target systems 106.

In one embodiment, intermediary messaging system 104 may include an input interface 202, a message sequencer 204, a message processor 206, a message dispatcher 208, an output interface 210, a cache server 212 and a message sequencing interface 214. The various components of the intermediary messaging system may be implemented as general purpose computers, specialized server computers, server farms, server clusters, software components executed by one or more processors or any other appropriate arrangement and/or combination. Intermediary messaging system 104 can communicatively connect source systems 102 with one or more target systems 106 via a communication network (e.g., 108) as shown in FIG. 1. The various components of intermediary messaging system 104 depicted in FIG. 2 are meant for illustrative purposes only and are not intended to limit the scope of embodiments of the present invention. Alternative embodiments may include more or fewer components than those shown in FIG. 2.

In certain embodiments, input interface 202 can provide a callable interface (e.g., an application programming interface) that can be invoked by source systems 102 to enable intermediary messaging system 104 to receive messages from the source systems 102 for communication to target systems 106. Input interface 202 can receive messages in a format consistent with one or more message communication protocols supported by the sender of the message (e.g., source systems 102).

Upon receiving a message, input interface 202 may provide the message to message sequencer 204 for delivery to a particular destination. Message sequencer 204 may identify the particular destination (i.e., a target system) for the message and determine information related to the message and provide this information to cache server 212. For instance, message sequencer 204 may determine a sequence number for the message, status information related to the message, a fan-out number for the message and the like. The fan-out number may indicate the number of destinations (target systems) that the message has to be delivered to. Such a message that is to be delivered to multiple destinations may be referred to as a multicast message.

In some embodiments, message sequencer 204 may invoke a set of functions provided by message sequencing application programming interface (API) 214 to determine information associated with a message. For instance, message sequencer 204 can invoke a "CREATE SEQUENCE" operation via message sequencing API 214 to determine a sequence number for a message. The "CREATE SEQUENCE" operation may assign a sequence number to the message received by the intermediary messaging system that is destined to a particular target system. In an embodiment, the sequence number assigned to a message may be determined based on the order in which the message was received by the intermediary messaging system. For instance, a first message destined to a target system (106-1) may be assigned a sequence number 1, a second message that is received after the first message that is destined to the same target system may be assigned a sequence number 2, a third message that is received after the second message destined to the target system may be assigned a sequence number 3, and so on.

In certain embodiments, message sequencer 204 may invoke a set of functions provided by message sequencing API 214 to determine the status of a message. For instance, the status of a message can include information related to the delivery status for the message. As noted above, the delivery status can indicate whether the message has been delivered (e.g., an acknowledgement of delivery has been received), whether the messages has been sent, whether an error has been encountered during delivery of the message, or other status associated with delivery of the message.

In certain embodiments, message sequencer 204 may invoke a set of functions provided by message sequencing API 214 to perform message sequence management operations related to the target systems. For instance, message sequencer 204 may determine a list all the targets that have been identified by the system, determine a list of messages for a given target system, retrieve sequencing information related to a target system, obtain the status for a target, pause consumption of a target, remove a sequencing entry associated with a target, resume consumption of a target which has been paused, update a sequencing entry associated with a target, and so on.

In certain embodiments, the messages received by intermediary messaging system 104 may be stored in cache server 212. As noted above, cache server 212 may include one or more distributed caches, which may be implemented as Coherence caches, wherein each computing node in the cluster of nodes in the distributed cache may be responsible for managing messages that are to be dispatched to a particular target system. The computing nodes may include one or more computing servers, virtual computing machines and the like.

In an embodiment, cache server 212 may be implemented as an in-process cache or as a distributed cache. Cache server 212 may be implemented as an in-process cache when there are a small but predictable number of frequently accessed, preferably immutable objects in the cache. When implemented an in-process cache, cache server 212 may include elements of the cache that are local to a single instance of an application. Since an in-process cache may typically make use of the same heap space as a currently executing application, an upper limit of memory usage for the cache may be determined, in certain embodiments.

For large, unpredictable volumes, cache server 212 may be implemented as a distributed cache or a distributed hash table. In this embodiment, cache server 212 may include a class of a decentralized distributed system that provides a lookup service similar to a hash table. For instance, (key, value) pairs may be stored in a distributed hash table and any participating node in the distributed cache can efficiently retrieve the value associated with a given key. Responsibility for maintaining the mapping from keys to values is distributed among the nodes, in such a way that a change in the set of participants causes a minimal amount of disruption. This allows scalability to extremely large numbers of nodes and to handle continual node arrivals, departures, and failures. Although deployed on a cluster of multiple nodes, cache server 212 may provide a single logical view (and state) of the cache. In most cases, an object stored in a distributed cache cluster will reside on a single node in a distributed cache cluster. By means of a hashing algorithm, cache server 212 can determine on which node a particular key-value resides. Since there is always a single state of the cache cluster, cache server 212 is never inconsistent.

In some embodiments, cache server 212 may be partitioned into a number of caches that can be configured to store information related to messages that are to be delivered to different target destinations. In an embodiment, the cache partitions of cache server 212 may comprise a sequence entry cache and a status cache. The sequence entry cache may store and/or maintain sequencing information related to messages that are to be delivered to a target system and the status cache may store and/or maintain status information related to messages that are to be delivered to the target system.

In an embodiment, cache server 212 may store the sequencing information and status information related to messages destined to a particular target system in the sequence entry cache and the status cache using one or more memory queues. For instance, a first memory queue may store sequencing information related to messages that are to be delivered to a target system and a second memory queue may store status information related to messages that are to be delivered to the target system. For purposes of this document, the first memory queue may be referred to as a message sequencing queue and the second memory queue may be referred to as a message status queue.

By storing information related to the messages in-memory using memory queues for each target system as disclosed above, the cost and time involved in acquiring and identifying a new target (by making roundtrips to a database) each time a message is received to the intermediary messaging system is minimized. Additionally, by creating queues to store information related to the messages destined to different target systems in memory, the sorting overhead involved in indexing and sorting entries in a database based on timestamps to obtain information related to messages destined to a target system can be minimized.

Figure 3:
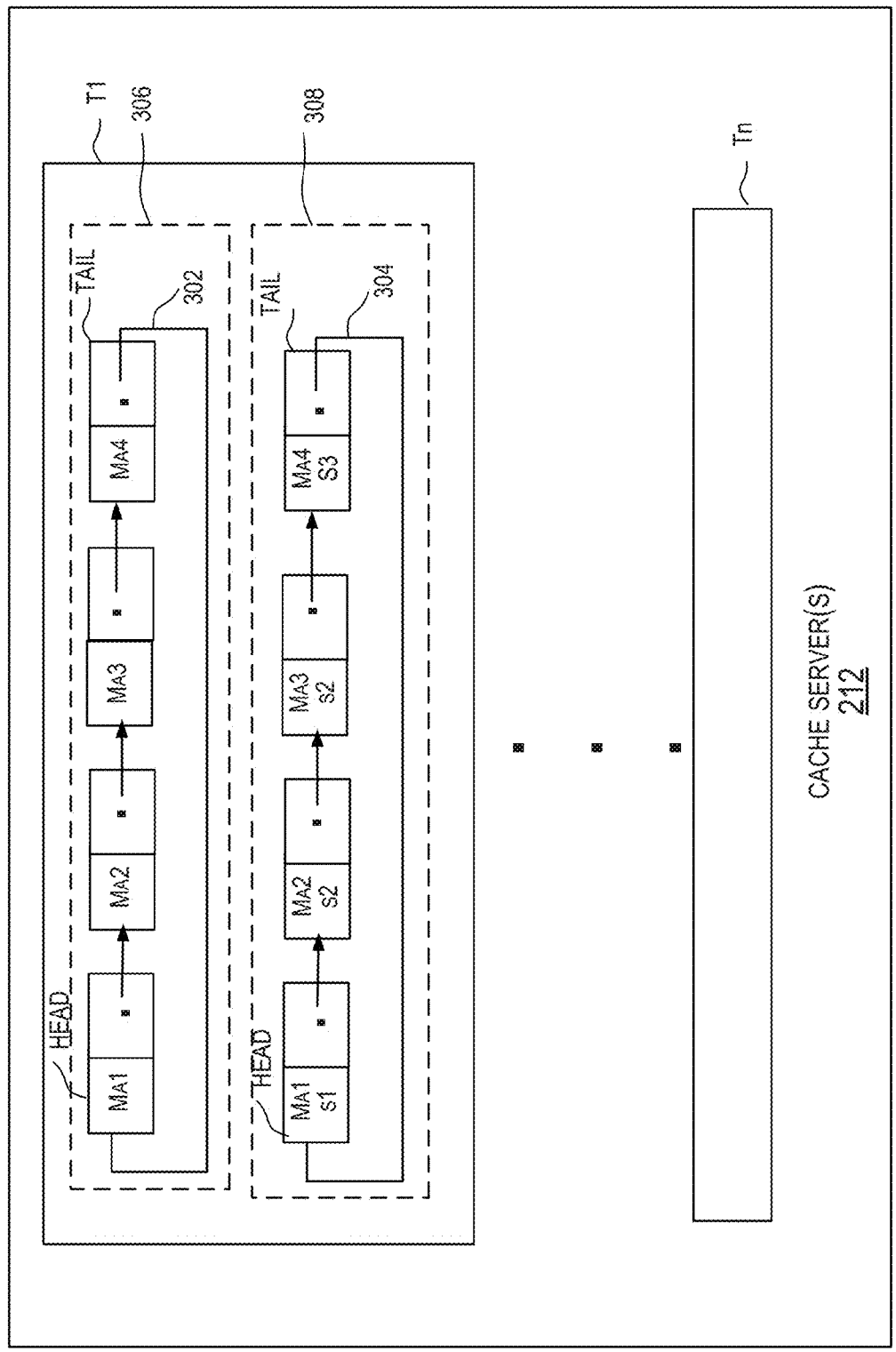
FIG. 3 is an illustration of an exemplary implementation of an in-memory message sequencing queue and an in-memory message status queue for a target destination, in accordance with an embodiment of the present disclosure.

In some embodiments, the message sequencing queue may store payload information and transport information associated with messages destined to a particular target system. Payload information may include the actual message content that is to be transmitted to the particular target system. Transport information may include a message identifier and a sequence number associated with the messages. As noted above, a message identifier may represent a unique identifier for a message. A sequence number for a message may be an integer that indicates the position of the message in the message sequencing queue. In an example, the sequence number assigned to a message is in the order of receipt of the message by intermediary messaging system 104. Thus, in some examples, the message sequencing queue may store information related to messages destined to a particular target system in a first in first out (FIFO) order. That is, the first message that is placed in the message sequencing queue 124 may be the first message that is taken off the queue. FIG. 3 is an exemplary illustration of a message sequencing queue for a target system, in accordance with an embodiment of the present invention.

The message status queue may store information related to the status of a message to be transmitted to a particular target system. For instance, the status of a message may include information related to the delivery status for the message as noted above. In some embodiments, the status of a message may include information about the direction of the message. The direction may indicate whether the message is queued in an 'inbound' direction or an 'outbound' direction. For instance, messages received to intermediary messaging system from source systems 102 may be queued in an 'inbound' direction whereas messages that are ready to be dispatched to target systems 106 may be queued in an 'outbound' direction.

In some embodiments, the message status queue may include information related to the 'status' of its corresponding target system. The status of a target system may include, for instance, a 'locked' status, a 'paused' status, a 'stacked' status, an 'in-memory' state status a 'Data Base Failover' status, a 'transition' status, a 'ready' status, a 'no data' status and the like. FIG. 3 is an exemplary illustration of a message status queue for a target system, in accordance with an embodiment of the present invention.

In some embodiments, the various 'statuses' that a target system can be in may be maintained in head and tail entries of the message status queue corresponding to the target system. For example, an 'in-memory' status may represent a tail entry status in the message status queue indicating that the target system is currently entirely in-memory, a 'Data Base Failover' status may represent a tail entry status in the message status queue indicating that the target system is currently in overflow mode, a 'transition' status may represent a tail entry status in the message status queue indicating that the target system is being transitioned between states, a 'ready' status may represent a head entry status in the message status queue indicating that the target system is ready to be picked, a 'no data' status may represent a head entry status in the message status queue indicating that the target system currently has no-data, a 'locked' status may represent a head entry status in the message status queue indicating that the target system is locked and being processed, a 'stacked' status may represent a head entry status in the message status queue indicating that the target system is stacked, a 'paused' status may represent a head entry status in the message status queue indicating that the target system is paused for consumption, and the like.

In some embodiments, the message entries for a message in the message sequencing queue and the message status queue may include a key value. The key value may be used to reference information related to a particular message stored in the message sequencing queue and the message status queue. For instance, the key value could correspond to the message identifier or the sequence number associated with the message, in some examples.

In certain embodiments, the message entries (e.g., stored in the message sequencing queue and the message status queue 126) corresponding to a target system as discussed above may reside on the same computing node in cache server 212. Thus, each computing node in cache server 212 may be responsible for managing the messages that are to be dispatched to a particular target system. In an embodiment, the message entries corresponding to each target system stored in a node in cache server 212 may be partitioned across several separate caches within cache server 212. For instance, as noted above, a message sequencing queue corresponding to a target system may be stored in a 'sequence entry cache' in cache server 212 and a message status queue corresponding to the target system may be stored in a 'status' cache in cache server 212. The storage of the entries corresponding to each target system may be partitioned across each node in the cluster of nodes in cache server 212.

In certain embodiments, the message sequencing queue and the message status queue corresponding to each target system 106 may be implemented in cache server 212 using one or more linked lists. A linked list as described herein refers to a data structure consisting of a group of nodes which together represent a sequence, wherein each node is composed of data and a reference (link) to the next node in the sequence.

Message processor 206 is capable of processing the messages received to intermediary messaging system 104 prior to transmission of the messages to the target systems. In certain embodiments, the messages can be processed according to a protocol supported by the target systems. Message processor 206 can implement a communication protocol stack by which inbound messages can be received from a source (e.g., a source system 106-1) and processed. The communication protocol stack may support communication protocols such as a service transport protocol (e.g., HTTP, SMTP, and FTP), a SOAP protocol, or a WS-RM messaging protocol.

In some embodiments, message processor 206 can process inbound messages received from intermediary messaging system 104 in parallel. Due to such parallel/concurrent processing, message processor 206 may process the messages in any sequence or order (i.e., asynchronously), depending on the processing resources allocated to concurrent executing entities in message processor 206. Accordingly, messages may be processed by message processor 206 in an order that is different from the order of receipt of the messages to intermediary messaging system 104.

Message dispatcher 208 is capable of handling the delivery of messages processed by message processor 206 to one or more destinations, such as one of the target systems 106.

The delivery of messages to a particular target system by message dispatcher 208 may be performed in the order of receipt of the messages by intermediary messaging system 104 to the particular target system. Thus, message dispatcher 208 may transmit a message to a particular target system only after all messages that were received prior to the message have been transmitted to the target system.

In certain embodiments, the delivery of messages by message dispatcher 208 may include receiving a signal from message processor 204 that a message destined to a particular target system is ready for transmission to the target system. The signal may indicate, for instance, a change in the delivery status of the message to a 'ready' state. Message dispatcher 208 may then access the memory queues (e.g., the message sequencing queue and the message status queue) corresponding to the target system to determine that no other message for the target system needs to be transmitted before the message. For instance, message dispatcher 118 may access the head entry of the message sequencing queue corresponding to the target system to determine whether the head entry of the message sequencing queue corresponds to the message received from message processor 206. If the head entry of the message queue corresponds to the message received from message processor 206 then, in some embodiments, the message is transmitted to the particular target system. The message entries corresponding to the message in the head of the message sequencing queue are removed and the head of queue is moved to the next entry in the queue.

If the head entry of the message queue does not correspond to the message received from message processor 206 then, in some embodiments, the message is added to a dispatch queue associated with message dispatcher 208 and transmitted and/or dispatched to the target systems after all messages that have to be transmitted before the message are transmitted to the target system. Thus, message dispatcher 208 ensures that the messages destined to a particular target system are transmitted to the target system in the order or sequence in which they were received by the intermediary messaging system. Additional details of the manner in which message dispatcher may dispatch messages to target systems are discussed in FIGS. 4 and 5.

Output interface 210 can provide a callable output interface that can be invoked for delivery of a message to a destination. In certain embodiments, output interface 210 can be invoked by message dispatcher 208 to send messages to a destination (e.g., the target systems 106). Output interface 210 can send messages in a format consistent with one or more message communication protocols supported by the destination where the messages are to be delivered.

Data store 110 may store the messages that are to be transmitted to target systems 106. In some examples, data store 110 stores records indicating the status of processing of the various messages received by intermediary messaging system 104. Data store 110 can be external to intermediary messaging system 104, in one embodiment.

In some embodiments, intermediary messaging system 104 may receive a message from a source system (e.g., 102-1) that is to be transmitted to more than one of the target systems 106. In such a situation, message sequencer 202 may receive the message and associated a fan-out number to the message. Message sequencer 202 may provide the fan-out information to cache server 212. In an embodiment, cache server 212 may then make a copy of information associated with the message in each of the identified destinations (target systems) for the message in the memory queues corresponding to the identified target systems based on the fan-out number associated with the message. For instance, if a particular message M1 is to be delivered to 3 target destinations, then message sequencer 202 may associate a fan-out number of 3 to the message and provide this information to cache server 212.

Message dispatcher 208 may then dispatch the message to the identified target systems upon receiving an indication that the message is ready for transmission. In an embodiment, message dispatcher 208 may transmit the message to the identified target systems in parallel if the status of all the target systems indicate that the target systems are in a 'ready' state to receive the message. In other embodiments, message dispatcher 208 may wait for a target system of the identified target systems to be in a 'ready' state before transmitting the message to the target system.

FIG. 3 is an illustration of an exemplary implementation of an in-memory message sequencing queue and an in-memory message status queue for a target destination, in accordance with an embodiment of the present disclosure. The example shown in FIG. 3 illustrates two memory queues 300 associated with a target system 106-1. The first memory queue is a message sequencing queue 302 that stores the message payload and sequencing information associated with messages to be delivered to target system 106-1. The second memory queue is a message status queue 304 that stores status information associated with messages to be delivered to target system 106-1. In an embodiment, message sequencing queue 302 corresponding to target system 106-1 may be stored in a sequence entry cache 306 in cache server 212 and message status queue 304 corresponding to the target system may be stored in a status cache 308 in cache server 212. Although, the example shown in FIG. 3 illustrates two memory queues associated with a target system, it is to be appreciated that more or fewer memory queues may be implemented for a target system, in other embodiments. In addition, while the illustrated example shows memory queues 302, 304 associated with target system 106-1, it is to be appreciated that similar memory queues may be implemented and/or provided for all the identified target systems by intermediary messaging system 104, in certain embodiments. For instance, as noted above, cache server 212 may be partitioned into a number of caches, wherein each cache partition can be configured to store information related to a particular target system in a sequence entry cache and a status cache, as discussed above.

In an embodiment, message sequencing queue 302 and message status queue 304 for a target destination (e.g., target system 106-1) can be implemented in cache server 212 as circular linked lists. As used herein, a circular linked list is a data structure consisting of a group of nodes which together represent a sequence. A circular linked list can enable a sequential access of the nodes in the list in both the backward and forward directions, in a cyclic order. As further illustrated, message sequencing queue 302 may include a head node (head entry) that points to the first element in the list and a tail node (tail entry) that points to the tail (last) element in the list.

Each node of message sequencing queue 302 may store the message payload and transport information associated with a message destined to a particular target system. As noted above, the message payload can include the actual content of the message. In some examples, the transport information may include a message identifier and a sequence number associated with the message. As noted above, a message identifier may represent a unique identifier for a message. A sequence number for a message may be an integer that indicates the position of the message in the message sequencing queue. In some examples, a message stored in message sequencing queue 302 may be identified as Mjk, where j represents the identifier for the message and k is an integer indicating the sequence number assigned to the message in the order of receipt of the message by intermediary messaging system 104. For instance, a message may be identified as MA1, where A is a unique identifier for the message and 1 is the sequence number assigned to the message.

Message status queue 304 may store information related to the status of a message to be transmitted to a particular target system. For instance, the status of a message may include information related to the delivery status (e.g., S2) for the message, as noted above. In some embodiments, the status of a message may include information about the direction (e.g., inbound/outbound) of the message. The delivery status can indicate whether the message has been delivered (e.g., an acknowledgement of delivery has been received), whether the message has been sent, whether an error has been encountered during delivery of the message, or other status associated with delivery of the message. Additional details regarding information related to the status of messages can be found in US. Publication No. US20150271253 A1, titled, "HIGH PERFORMANCE ERP SYSTEM ENSURING DESIRED DELIVERY SEQUENCING OF OUTPUT MESSAGES," the entire contents of which are incorporated herein by reference for all purposes.

In certain embodiments, message status queue 304 may also include information related to the 'status' of its corresponding target system. The status of a target system may include, for instance, a 'locked' status, a 'paused' status, a 'stacked' status, an 'in-memory' state status a 'Data Base Failover' status, a 'transition' status, a 'ready' status, a 'no data' status and the like. In one implementation, the status (e.g., S1, S3) of the target system may be maintained in the head and tail entries of message status queue 304.

The example shown in FIG. 3 is an exemplary illustration of message sequencing queue 302 and message status queue 304 storing information related to four messages destined to a particular target system T1. Message sequencing queue 302 and message status queue 304 may be capable of storing information related to more or fewer number of messages destined to target system T1, in other embodiments.

Figure 3A:
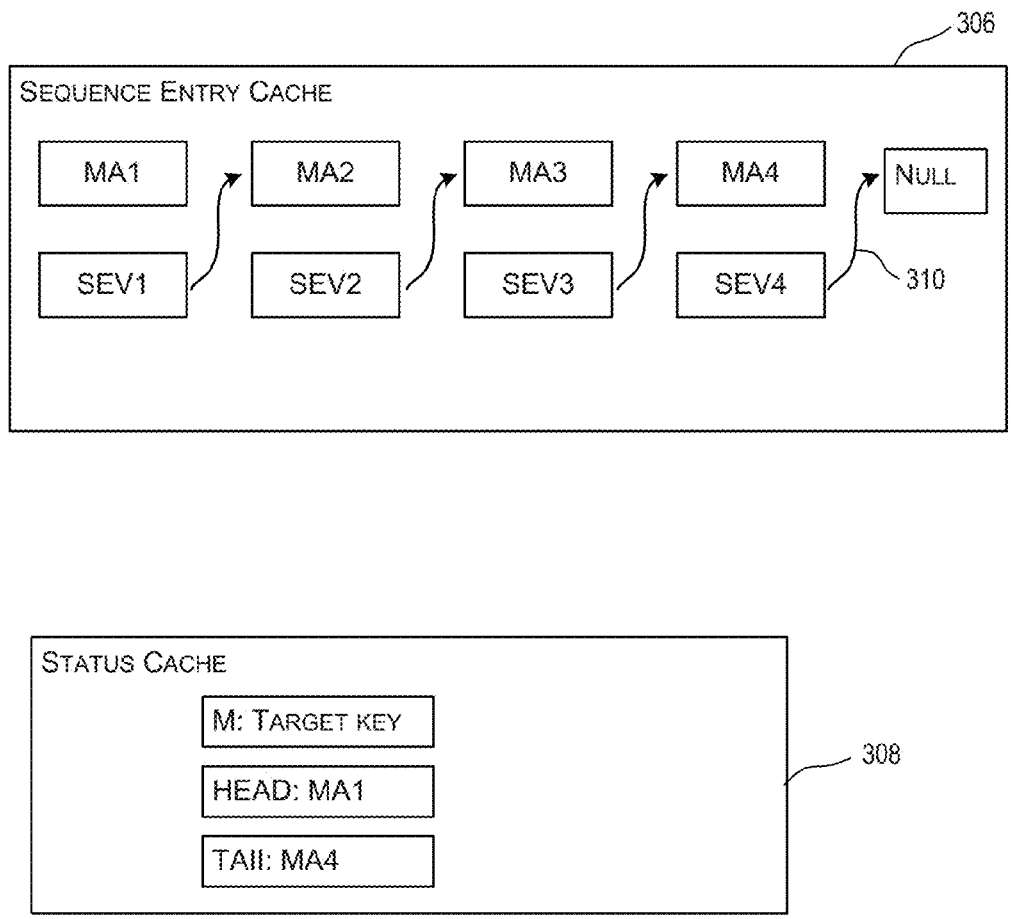
FIG. 3A is an exemplary illustration of an implementation of an in-memory queue for a target destination, in accordance with one embodiment of the present invention.
Figure 3B:
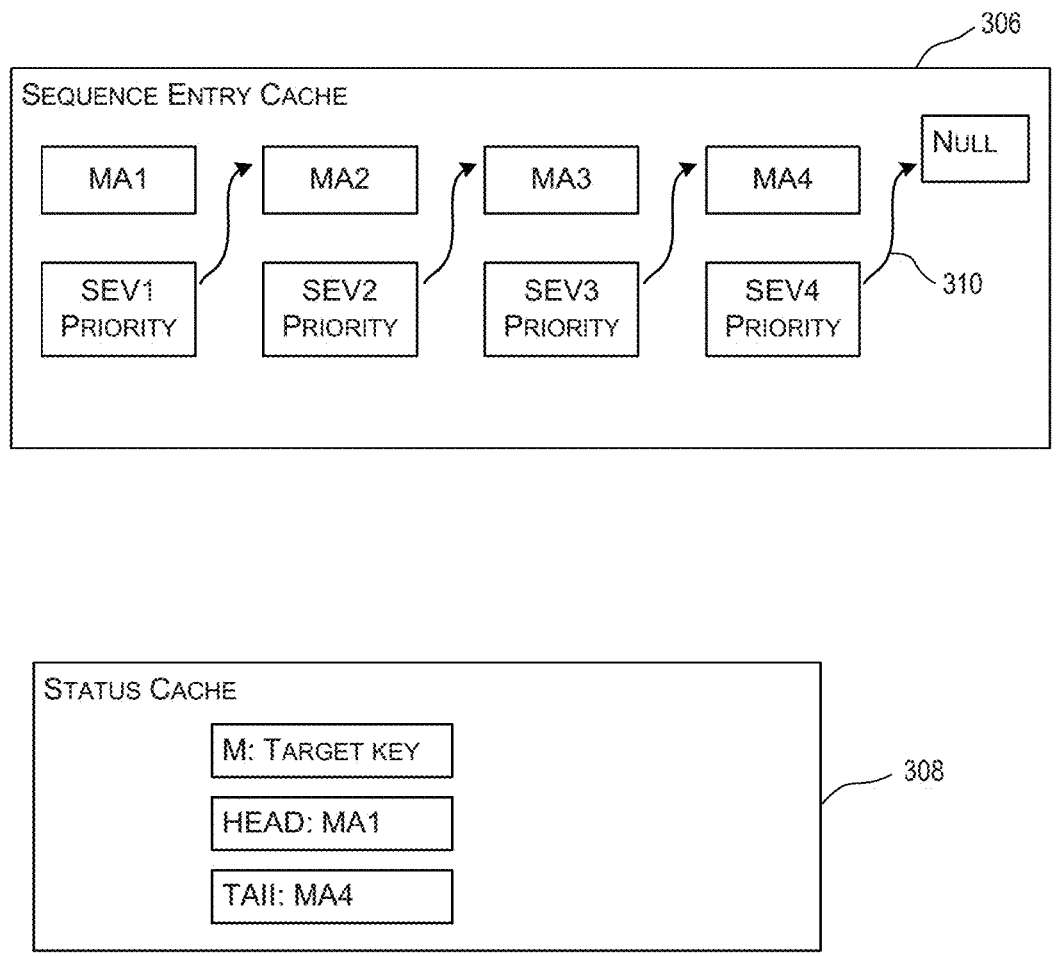
FIG. 3B is an exemplary illustration of an implementation of an in-memory queue for a target destination, in accordance with another embodiment of the present invention.
Figure 3C:
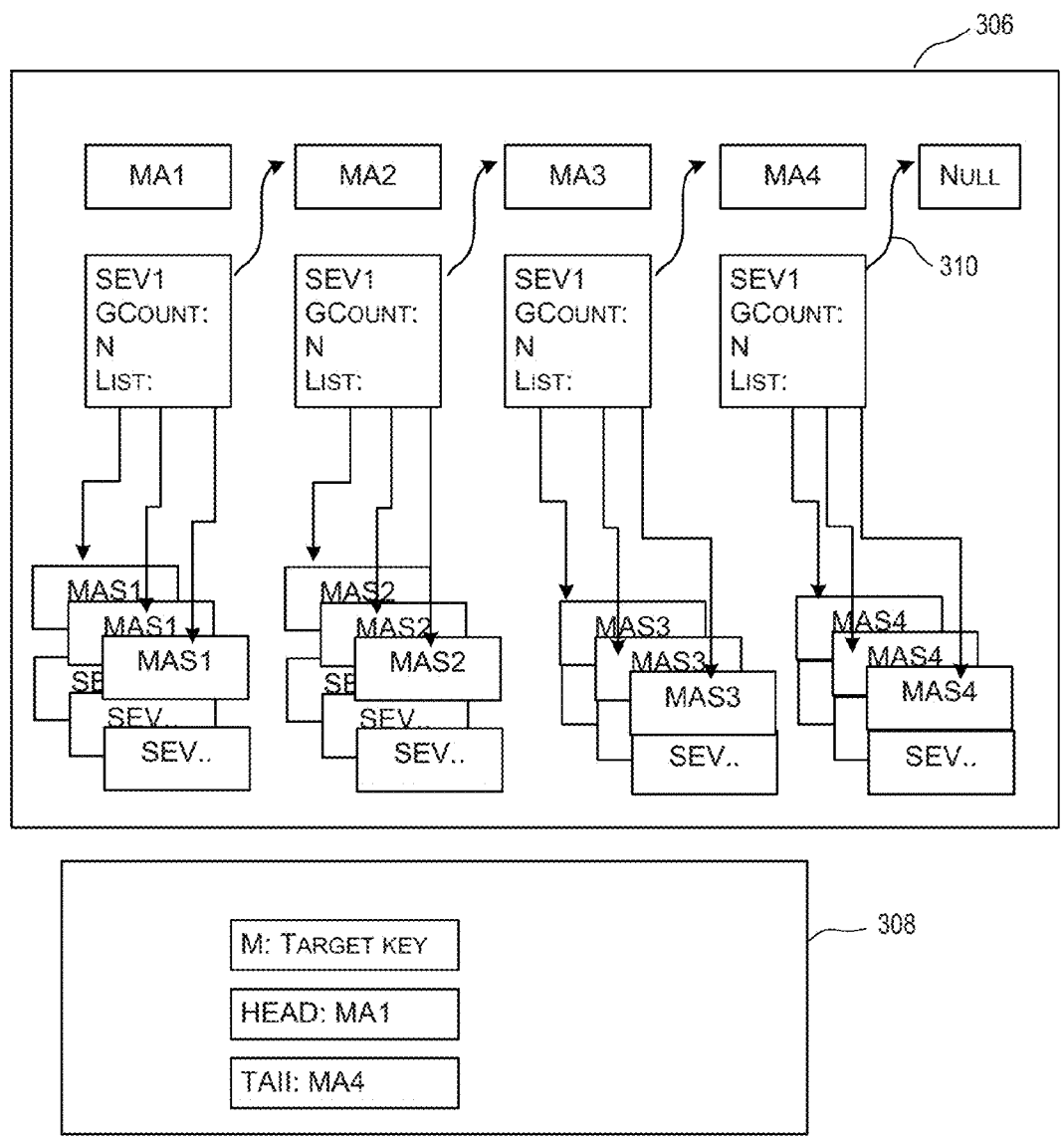
FIG. 3C is an exemplary illustration of an implementation of an in-memory queue for a target destination, in accordance with yet another embodiment of the present invention.

FIGS. 3A-3C illustrate various implementations of in-memory queues for storing information related to messages destined to target systems. FIG. 3A is an exemplary illustration of an implementation of an in-memory queue for a target destination, in accordance with one embodiment of the present invention. In the embodiment depicted in FIG. 3A, the in-memory queue may be implemented using a data structure such as a linked list 310 that is configured to store information related to messages destined to a target system in a First In First Out (FIFO) order. Linked list 310 may be stored in a sequence entry cache (e.g., 306) of a cache server (e.g., 212) Linked list 310 may include message sequencing entries related to messages destined to a particular target system. Each sequence entry may include a set of key value pairs, wherein a key in the key value pair represents a message, MA1, where A is a unique identifier for the message, 1 is the sequence number assigned to the message and the value (SEV1) represents the message payload (e.g., actual content) of the message MA1. Status cache 308 may store and/or maintain status information related to the target system that the messages in message sequencing queue 306 are destined to.

FIG. 3B is an exemplary illustration of an implementation of an in-memory queue for a target destination, in accordance with another embodiment of the present invention. In the embodiment depicted in FIG. 3B, the in-memory queue is implemented as a linked list 310 that is configured to store information related to messages destined to a target system in a First In First Out (FIFO) order with priority information. In this embodiment, each entry in linked list 310 may also include priority information (e.g., an integer value) related to messages destined to a particular target system. During message processing (for e.g., by message processor 206), when a message with a higher priority arrives, the message is en-queued and the head entry of linked list 310 is updated to store the message with the higher priority.

FIG. 3C is an exemplary illustration of an implementation of an in-memory queue for a target destination, in accordance with yet another embodiment of the present invention. In the embodiment depicted in FIG. 3C, the in-memory queue is implemented as a linked list 310 and is configured to provide in-memory interface sequencing of messages destined to a target system. In this embodiment, the FIFO order of messages may be achieved across endpoints, by correlating the messages across the layers and enforcing sequencing at the point of delivery to the target endpoint. Using this approach, the number of sequencing checkpoints may be reduced to provide a single point of sequence management and improved performance and scalability of the system since sequencing is typically not performed in the interaction boundaries between the components of the intermediary messaging system (e.g., 104).

In certain embodiments, the above approach may support FIFO ordering as well as fan out cases for interface sequencing. In order to support fan-out cases, the message processor (e.g., 206) may be configured to include a 'GCOUNT' (group count) flag which may indicate the number of outbound messages that it needs to process. In an example, the group count value may indicate the number of sub-messages in a message entry in the sequence entry cache. For instance, the group count value for a message MA1 destined to a particular target destination that includes three sub-messages (e.g., MA1, MA2, MA3) is three. The sub-messages may be processed in any order by the message processor (e.g., 206). Once all the sub-messages of the message are processed, the processing of the parent message may be marked as complete or ready. The LIST parameter in linked list 310 stores information related to a list of the sequencing entries associated with the message, and the MAS parameter is indicative of the sub-messages of the messages (MA1, MA2, MA3, MA4) in linked list 310.

Once processed, the message may be delivered to the appropriate target destination by message dispatcher 208. For instance, as noted above, the message dispatcher may receive a signal from message processor 206 that a particular message, MA1, is ready to be dispatched. The signal may indicate for instance, a change in the delivery status of the message to a 'ready' state. In an embodiment, the message dispatcher may deliver the message in a FIFO order (i.e., in the sequence in which the message arrived to the intermediary messaging system 104) by accessing the head entry of linked list 310 corresponding to the target destination to determine whether the head entry corresponds to the message (e.g., MA1) to be dispatched.

In certain embodiments, message processor 206 may be configured to perform a number of functions associated with the message entries stored in the memory queues. For instance, message processor 206 may implement a 'HeadIncrementProcessor' function to remove an entry from the sequence entry cache and increment the status entry in the status cache. In some examples, the message processor may be configured to update both the caches when the entries are associated through a key associator in the memory queues. Message processor 206 may implement a 'TailCreationProcessor' function which can be executed on the caches 306, 308 to create tail entries. For instance, message processor 206 may add one or more tail entries to the caches for a given target. Additionally, message processor 206 may implement a 'TargetEntryProcessor' function to handle creation of interface sequencing target entries, an 'UpdateStateProcessor' function to update the state of sequencing entries, a 'DiscardEntryProcessor' to discard an entry from the head entry for targets, a 'HeadStateProcessor' function to update the state of the head entry for targets, and the like.

In certain embodiments, intermediary messaging system 104 may be configured to support Content Based Interface Sequencing (fan-out), depending upon the type of the message or message content in the payload. In this situation, the message sequencer (e.g., 204) can apply routing logic in the pre-processing phase to add the fan-out number to the group count flag in the message entry before transmitting the message to the backend rather than waiting for the message processor to update the message with the fan-out number in the group count flag. Thus, the message sequencer can dynamically generate a group count number to handle fan-out scenarios depending on the message payload for any target destination. In some embodiments, for the same target destination, different types of messages can be dispatched without the help of an additional mediator layer.

In addition, by using a data structure that uses a sorted circular linked list for a sequenced target and a distributed cache associated with own thread pool, the disclosed system enables various operations to be performed on the messages such as create, update, read and delete operations in constant time, asynchronously. This approach results in less thread contention and helps handle high volume of data and without much latency. Using this approach, the system can scale well and perform in both parallel and concurrent modes.

Figure 4:
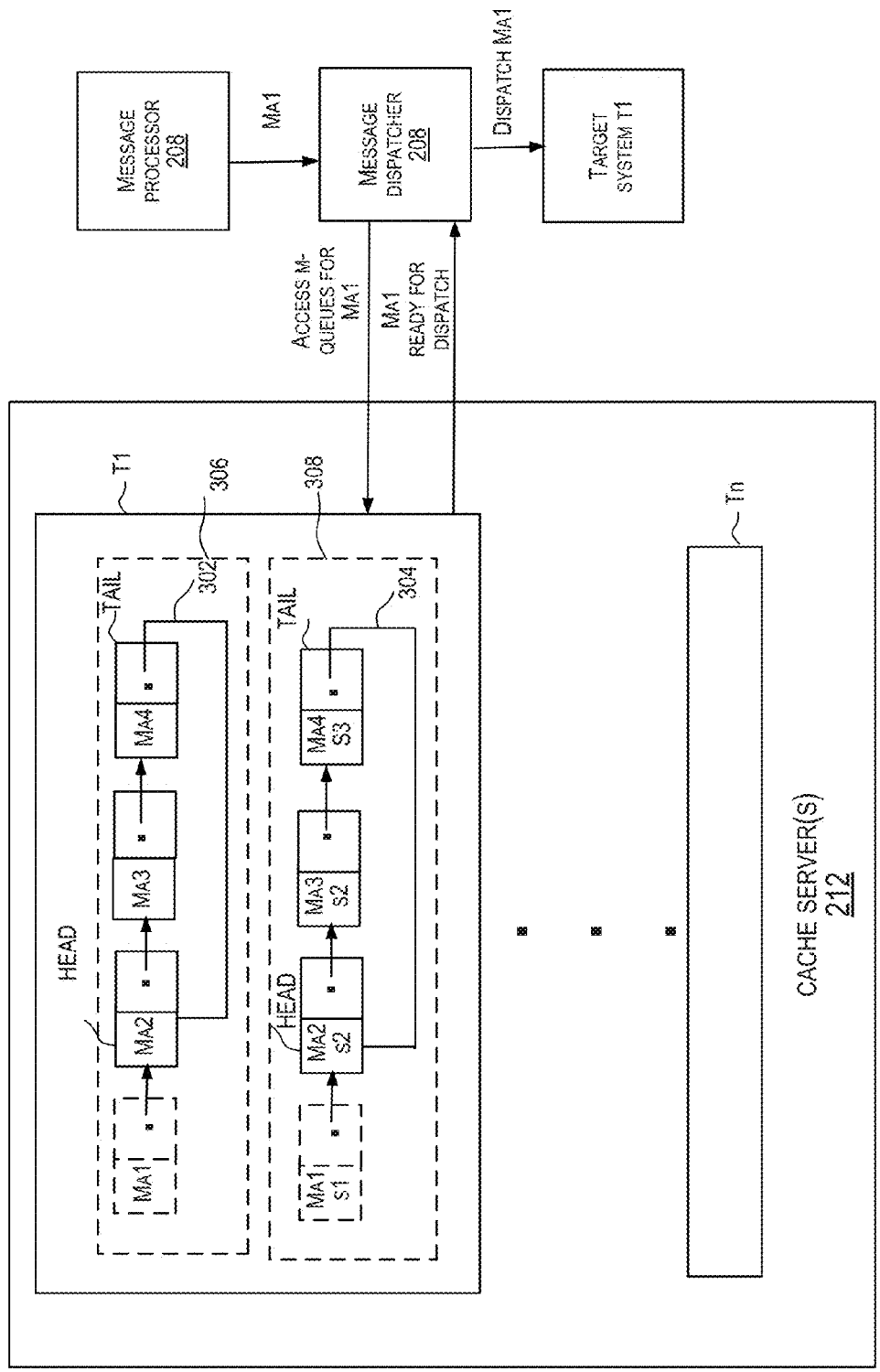
FIG. 4 illustrates the manner in which a message may be dispatched by intermediary messaging system, in accordance with an embodiment of the present disclosure.

FIG. 4 illustrates the manner in which a message may be dispatched by intermediary messaging system, in accordance with an embodiment of the present disclosure. In the example shown in FIG. 4, message dispatcher 208 receives a signal from message processor 206 that a particular message, MA1, is ready to be dispatched. The signal may indicate, for instance, a change in the delivery status of the message to a 'ready' state. Upon receiving the signal, message dispatcher 208 identifies the target destination (target system) for the message and accesses the corresponding memory queues 302, 304, associated with the target system stored in cache server 212. In some examples, message dispatcher 208 accesses the head entries of the memory queues corresponding to the target system to determine whether the head entries correspond to the message that is ready to be dispatched. If the head entries correspond to the message (e.g., MA1) that is ready to be dispatched then, message dispatcher 208 transmits the message to the particular target system. As further illustrated, once the message is dispatched, cache server 212 may remove the message entries corresponding to the message in the head entries and move the respective head entries of the message queues to point to the next element (node MA2) in the queues. In some examples, cache server 212 may update the status information associated with the message and/or status information of the target system associated with the message when the message is dispatched to the target system.

Figure 5:
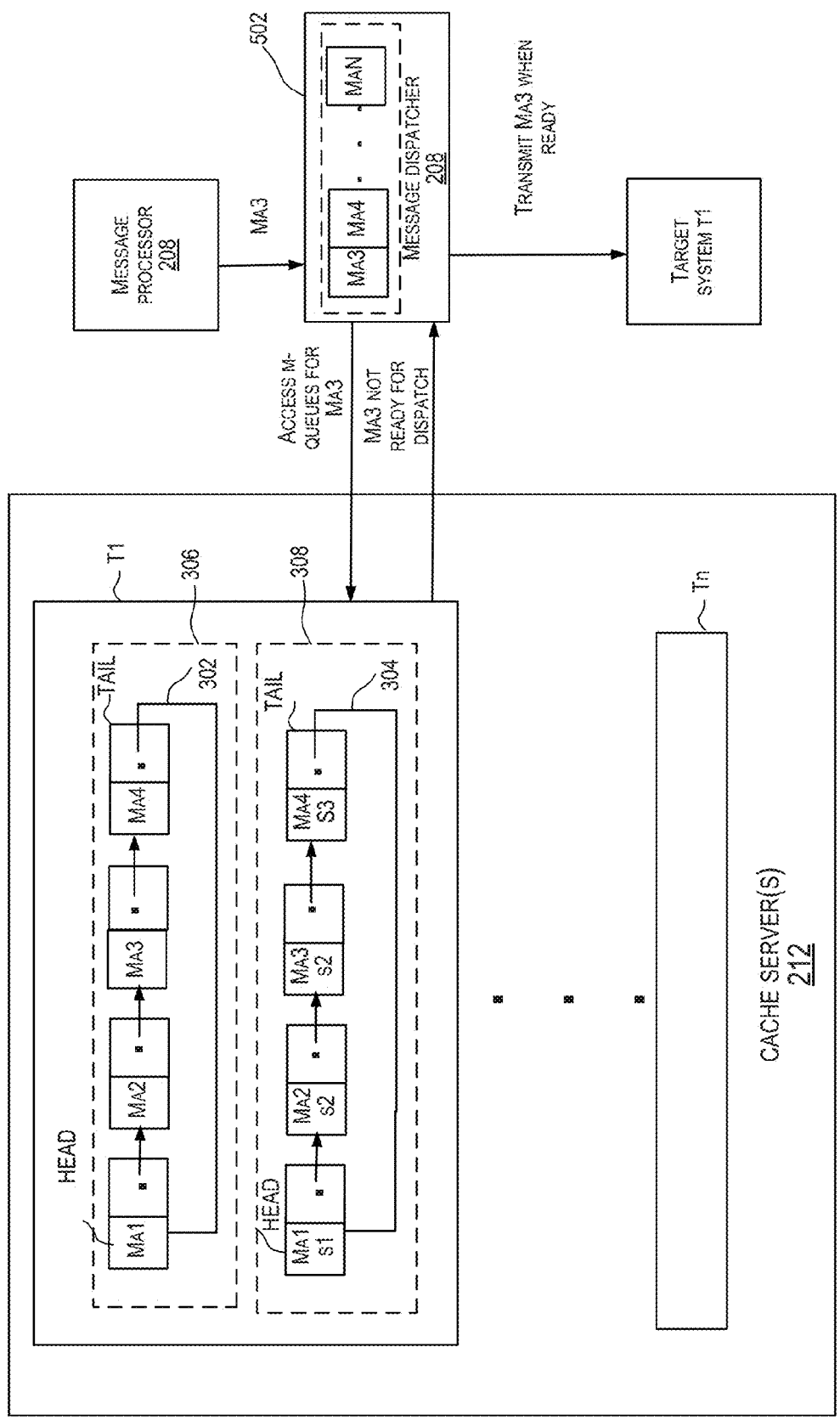
FIG. 5 illustrates the manner in which a message may be dispatched by intermediary messaging system, in accordance with another embodiment of the present disclosure.

FIG. 5 illustrates the manner in which a message may be dispatched by intermediary messaging system, in accordance with another embodiment of the present disclosure. In the example shown in FIG. 5, message dispatcher 208 receives a signal from message processor 206 that a particular message, MA3, is ready to be dispatched. Upon receiving the signal, message dispatcher 208 identifies the target destination (target system) for the message and accesses the corresponding memory queues 302, 304, associated with the target system stored in cache server 212. Message dispatcher 208 accesses the head entries of the memory queues corresponding to the target system to determine whether the head entries correspond to the message, MA3 that is ready to be dispatched. In this case, message dispatcher 208 determines that the head entries of the memory queues corresponding to the target system do not correspond to the message, MA3 that is ready to be dispatched. In this situation, message dispatcher 208 stores the message, MA3 in a dispatch queue 502 and only transmits the message, MA3, after all messages (i.e., MA1 and MA2) that have to be transmitted before MA3 are transmitted. Thus, message dispatcher 208 ensures that the messages to be delivered to a particular target system are delivered in the order or sequence in which they are received by intermediary messaging component 104. In an example, the dispatch queue may be implemented using a data structure such as a linked list as discussed in relation to memory queues discussed above.

Figure 6:
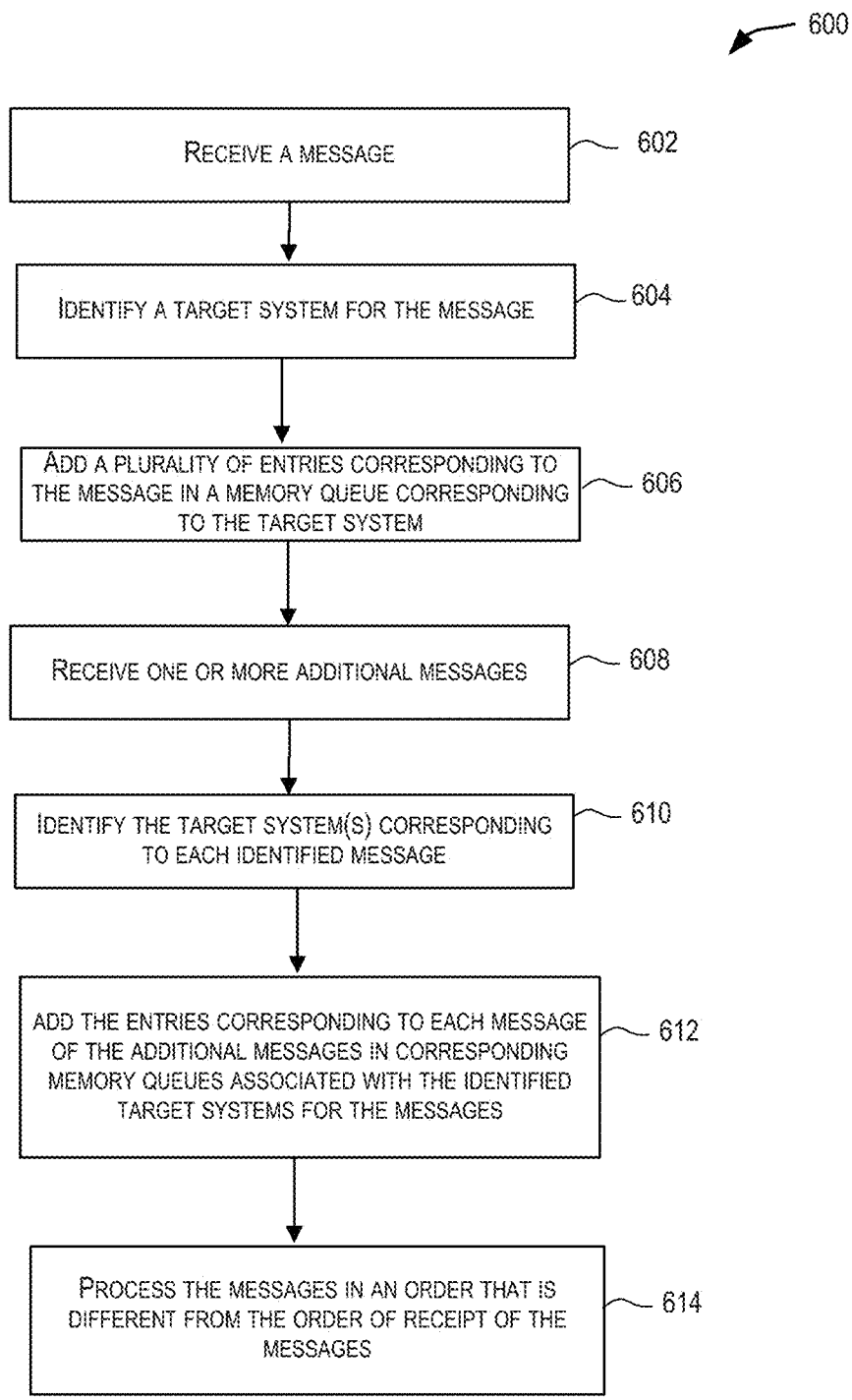
FIG. 6 illustrates a flow diagram of an example process for providing message delivery services in accordance with one embodiment of the present disclosure.
Figure 7:
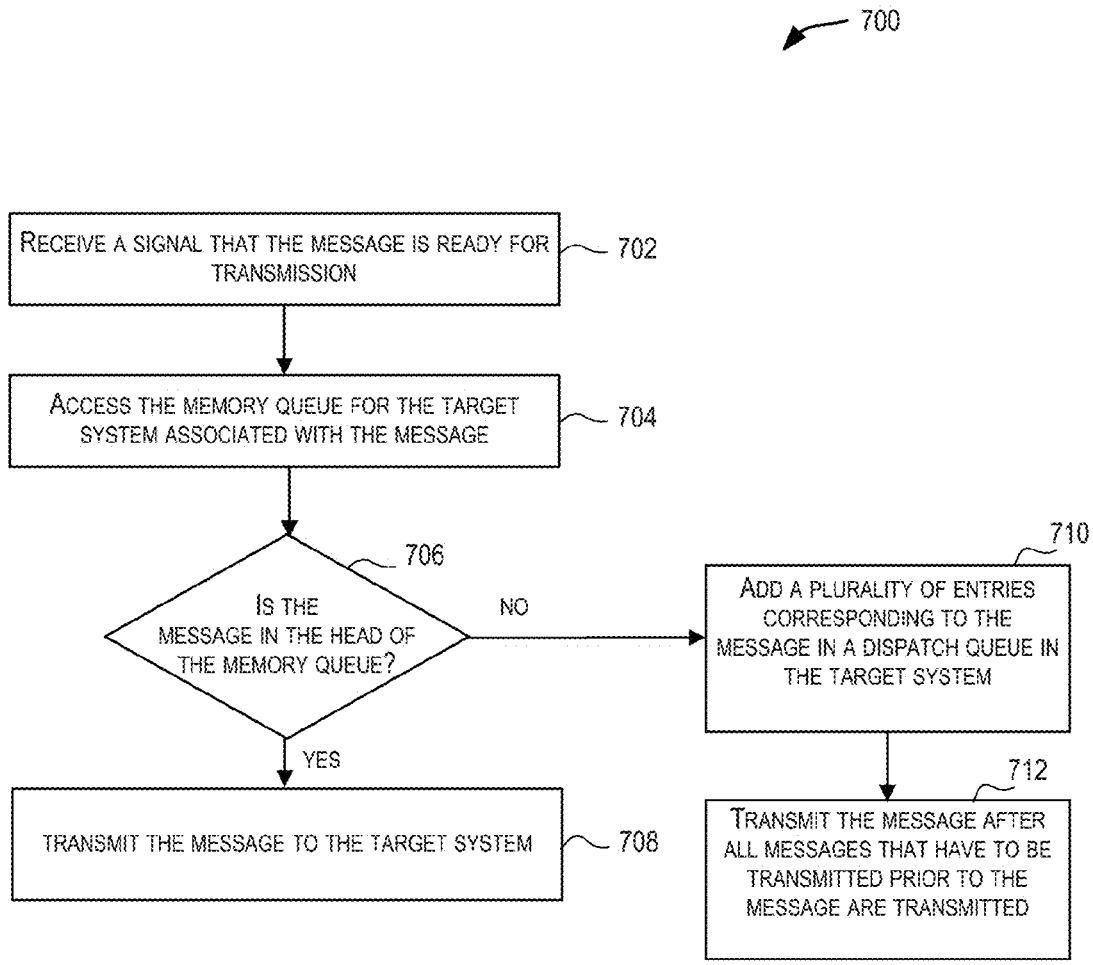
FIG. 7 illustrates a flow diagram of an example process for dispatching a message in accordance with one embodiment of the present disclosure.
Figure 8:
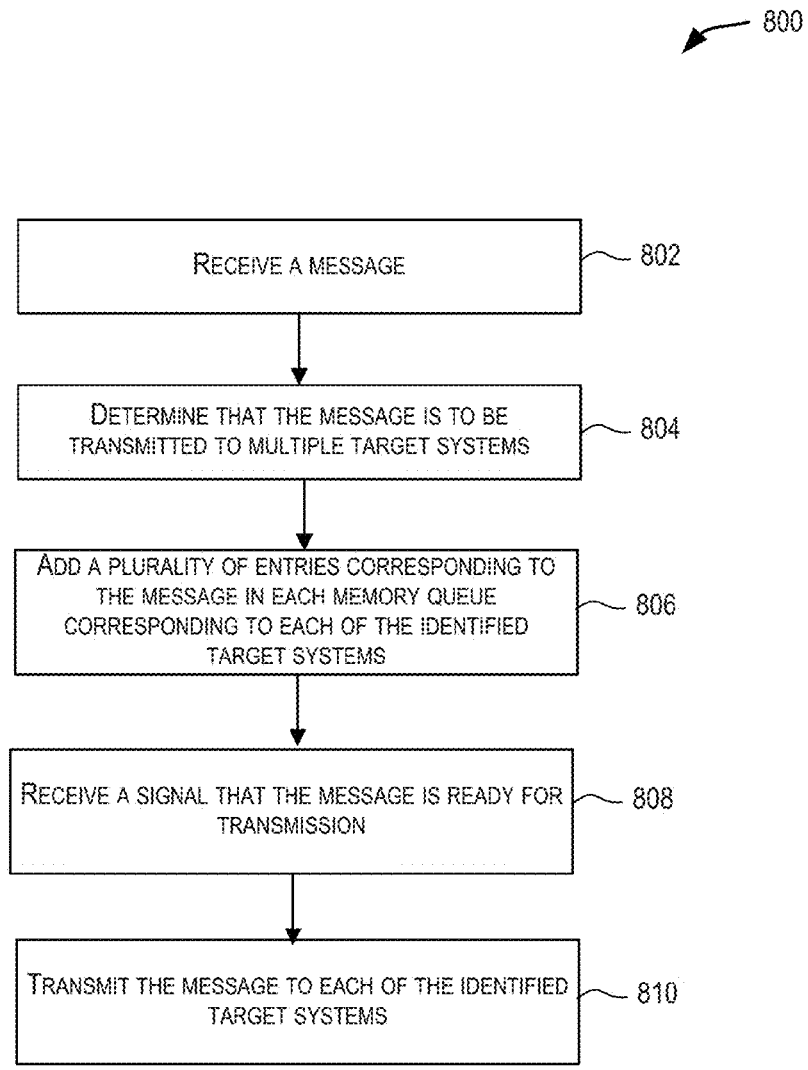
FIG. 8 illustrates a flow diagram of an example process for transmitting a multicast message, in accordance with one embodiment of the present disclosure.

FIGS. 6-8 illustrate example flow diagrams showing respective processes 600, 700 and 800 of providing message delivery services according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the intermediary messaging system (e.g., utilizing at message sequencer 204, message processor 206 and message dispatcher 208) shown in at least FIG. 2 (and others) may perform the processes 600, 700 and 800 of FIGS. 6-8 respectively.

FIG. 6 illustrates a flow diagram of an example process 600 for providing message delivery services in accordance with one embodiment of the present disclosure. The process at 600 may begin at 602 when a message is received by the intermediary messaging system from a source system (e.g., 102). For instance, a user may utilize an application executing at the source system to send a message to the intermediary messaging system to request a service from a target system (e.g., 106) or to request for a resource provided by the target system. Upon receiving the message, at 604, the intermediary messaging system may identify the destination (target system) for the message. At 606, the intermediary messaging system may add a plurality of entries corresponding to the message in a memory queue corresponding to the target system. As noted above, the plurality of entries may include the message payload, transport information associated with the message such as a message identifier and a sequence number, status information associated with the message, status information associated with the target system and the like. In an embodiment, the plurality of entries may be added in a memory queue (e.g., a message sequencing queue and a message status queue) associated with the target system. In some examples, the memory queues may be implemented using a data structure such as a circular linked list and the plurality of entries may be added to the nodes of the linked list as described in FIG. 3.

In some embodiments, at 608, the intermediary messaging system may receive one or more additional messages from the source systems. At 610, the intermediary messaging system may identify, for each received message, a target system corresponding to the message. At 612, the intermediary messaging system may add a plurality of entries corresponding to each message in corresponding memory queues associated with the identified target systems for the messages. Additionally, as noted above, the messages for each target system are stored in their respective memory queues in the order in which they are received by the intermediary messaging system. At 614, the intermediary messaging system processes the messages. In an embodiment, the messages may be processed in an order that is different from the order of receipt of the messages.

FIG. 7 illustrates a flow diagram of an example process 700 for dispatching a message in accordance with one embodiment of the present disclosure. In an embodiment, this process may be performed by the message dispatcher in the intermediary messaging system. At 702, the message dispatcher receives a signal that a message is ready for transmission. As noted above, the signal may indicate, for instance, a change in the delivery status of the message to a 'ready' state or a change in the status of the target system to a 'ready' state. Upon receiving the signal, at 704, the message dispatcher may identify the target destination (target system) for the message and access the corresponding memory queue(s) (e.g., 302, 304), associated with the target system stored in cache server 212.

In some embodiments at 706, the message dispatcher may determine if the message that is ready to be dispatched corresponds to the message in the head entry node of the memory queues (302, 304). If it is determined that the message corresponds to the message in the head entry node, then in some embodiments, at 708, the message dispatcher transmits the message to the target system. If it is determined from the memory queue that at least one other message for the target system needs to be transmitted before the message, then in some embodiments, at 710, the message dispatcher adds a plurality of entries corresponding to the message in a dispatch queue in the target system. At 712, the message dispatcher transmits the message only after all the messages that have to be transmitted prior to the message are transmitted. Thus, the message dispatcher ensures that the messages destined to a particular target system are transmitted to the target system in the order or sequence in which they were received by the intermediary messaging system.

FIG. 8 illustrates a flow diagram of an example process 800 for transmitting a multicast message, in accordance with one embodiment of the present disclosure. In some embodiments, the process 800 may be performed when the intermediary messaging system receives a message from a source system at 802 and determines, at 804, that the message is to be transmitted to multiple target destinations. Such a message that is to be delivered to multiple destinations may be referred to herein as a multicast message. At 806, the intermediary messaging system adds a plurality of entries corresponding to the message in each memory queue corresponding to each of the identified target systems. In this case, the plurality of entries may also include a fan-out number for the message that indicates the number of destinations (target systems) that the message has to be delivered to. At 808, the intermediary messaging system may receive signal that the message is ready for transmission. At 810, the intermediary messaging system may transmit the message to each of the identified target destinations. The message may be transmitted to the identified target destinations in parallel or in a sequential manner. For instance, if one or more of the identified target destinations is in a 'ready' state, then the intermediary messaging system may transmit the message to the identified target systems in parallel.

Figure 9:
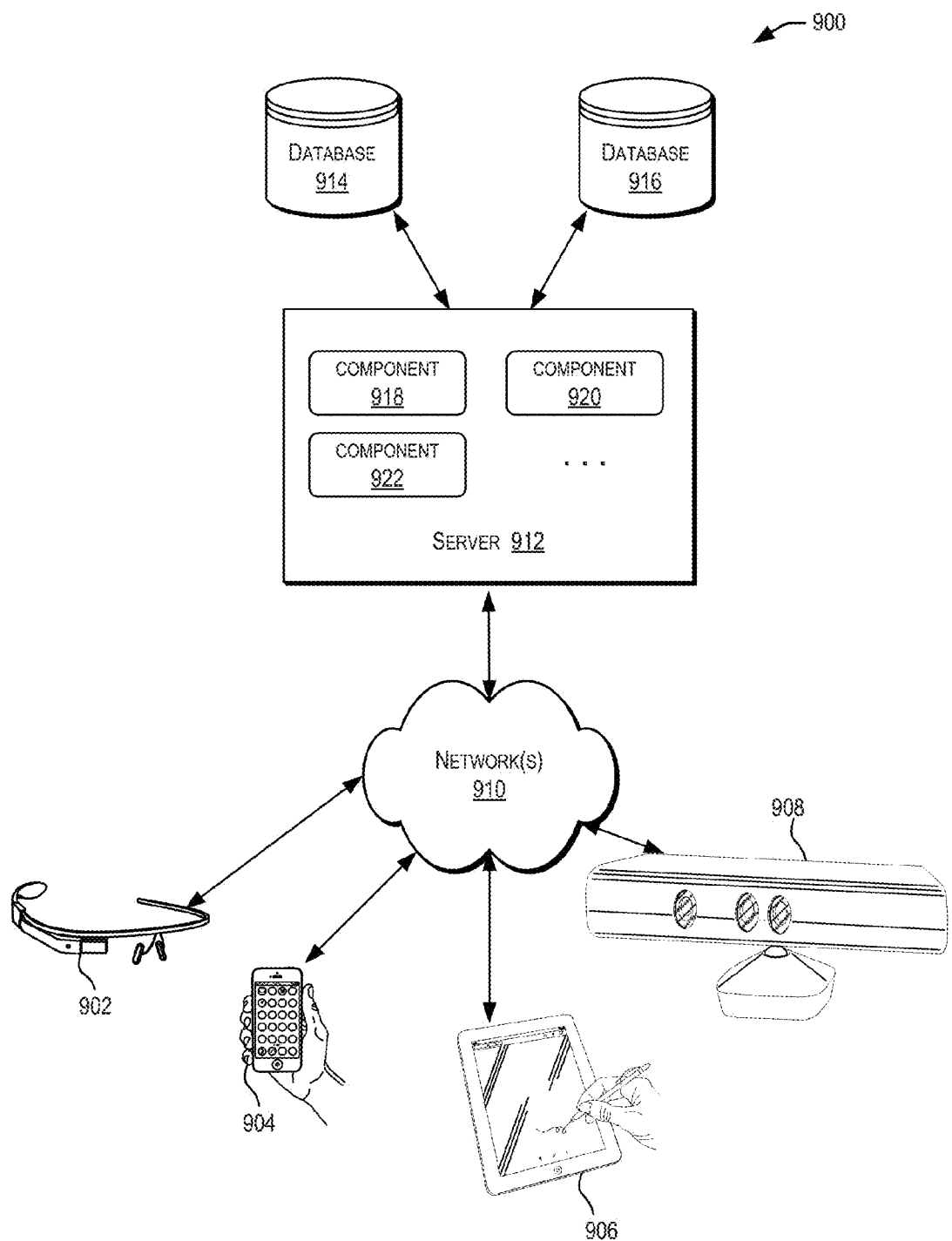
FIG. 9 depicts a simplified diagram of a distributed system for implementing an embodiment.

FIG. 9 depicts a simplified diagram of a distributed system 900 for implementing an embodiment. In the illustrated embodiment, the distributed system 900 includes one or more client computing devices 902, 904, 906, and 908, which are configured to execute and operate a client application such as a web browser, proprietary client (e.g., Oracle Forms), or the like over one or more network(s) 910. The server 912 may be communicatively coupled with the remote client computing devices 902, 904, 906, and 908 via network 910.

In various embodiments, the server 912 may be adapted to run one or more services or software applications such as services and applications that provide message delivery services. In certain embodiments, the server 912 may also provide other services or software applications can include non-virtual and virtual environments. In some embodiments, these services may be offered as web-based or cloud services or under a Software as a Service (SaaS) model to the users of the client computing devices 902, 904, 906, and/or 908. Users operating the client computing devices 902, 904, 906, and/or 908 may in turn utilize one or more client applications to interact with the server 912 to utilize the services provided by these components.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computing devices 902, 904, 906, and/or 908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 910.

Although distributed system 900 in FIG. 9 is shown with four client computing devices, any number of client computing devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 912 may include one or more applications to analyze and consolidate data feeds and/or event updates received from users of the client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 912 may also include one or more applications to display the data feeds and/or real-time events via one or more display devices of the client computing devices 902, 904, 906, and 908.

The distributed system 900 may also include one or more databases 914 and 916. These databases may provide a mechanism for storing information such as inventory information, and other information used by embodiments of the present invention. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In one set of embodiments, the databases 914 and 916 may reside in a storage-area network (SAN). Similarly, any necessary files for performing the functions attributed to the server 912 may be stored locally on the server 912 and/or remotely, as appropriate. In one set of embodiments, the databases 914 and 916 may include relational databases, such as databases provided by Oracle, that are adapted to store, update, and retrieve data in response to SQL-formatted commands.

Figure 10:
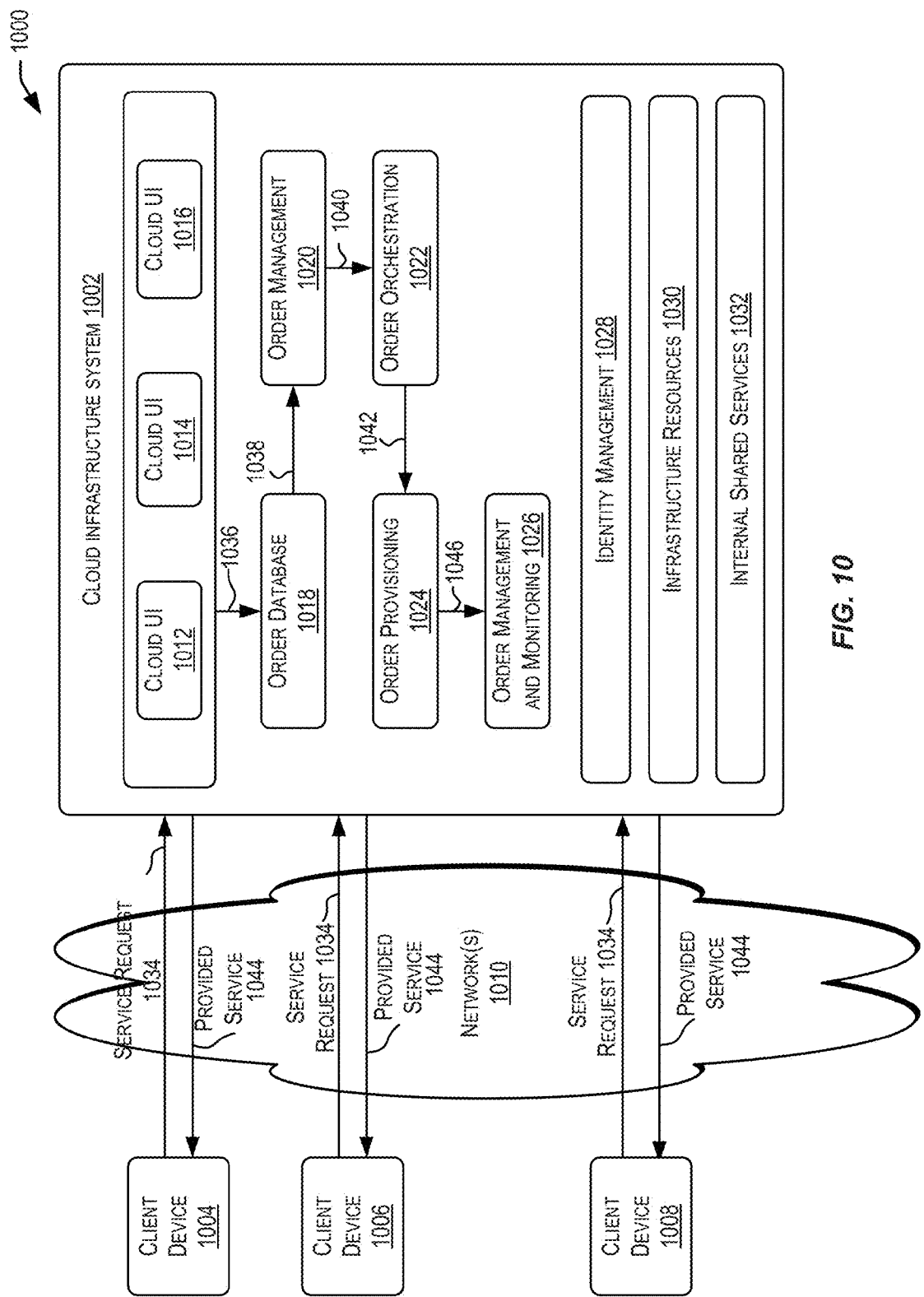
FIG. 10 is a simplified block diagram of one or more components of a system environment in which services may be offered as cloud services, in accordance with an embodiment of the present disclosure.

In some embodiments, the message delivery services described above may be offered as services via a cloud environment. FIG. 10 is a simplified block diagram of one or more components of a system environment 1000 in which services may be offered as cloud services, in accordance with an embodiment of the present disclosure. In the illustrated embodiment in FIG. 10, system environment 1000 includes one or more client computing devices 1004, 1006, and 1008 that may be used by users to interact with a cloud infrastructure system 1002 that provides cloud services, including services for dynamically modifying documents (e.g., webpages) responsive to usage patterns. Cloud infrastructure system 1002 may comprise one or more computers and/or servers that may include those described above for server 912.

It should be appreciated that cloud infrastructure system 1002 depicted in FIG. 10 may have other components than those depicted. Further, the embodiment shown in FIG. 10 is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908. Client computing devices 1004, 1006, and 1008 may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002. Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

In certain embodiments, services provided by cloud infrastructure system 1002 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1002 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle Corporation) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1002 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform, and other resources.

In some embodiments, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 to enable provision of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in FIG. 10, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In an exemplary operation, at 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI) such as cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

At 1036, the order information received from the customer may be stored in an order database 1018. If this is a new order, a new record may be created for the order. In one embodiment, order database 1018 can be one of several databases operated by cloud infrastructure system 1018 and operated in conjunction with other system elements.

At 1038, the order information may be forwarded to an order management module 1020 that may be configured to perform billing and accounting functions related to the order, such as verifying the order, and upon verification, booking the order.

At 1040, information regarding the order may be communicated to an order orchestration module 1022 that is configured to orchestrate the provisioning of services and resources for the order placed by the customer. In some instances, order orchestration module 1022 may use the services of order provisioning module 1024 for the provisioning. In certain embodiments, order orchestration module 1022 enables the management of business processes associated with each order and applies business logic to determine whether an order should proceed to provisioning.

As shown in the embodiment depicted in FIG. 10, at 1042, upon receiving an order for a new subscription, order orchestration module 1022 sends a request to order provisioning module 1024 to allocate resources and configure resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. This enables order orchestration module 1024 to be isolated from implementation details, such as whether or not services and resources are actually provisioned on the fly or pre-provisioned and only allocated/assigned upon request.

At 1044, once the services and resources are provisioned, a notification may be sent to the subscribing customers indicating that the requested service is now ready for use. In some instance, information (e.g. a link) may be sent to the customer that enables the customer to start using the requested services.

At 1046, a customer's subscription order may be managed and tracked by an order management and monitoring module 1026. In some instances, order management and monitoring module 1026 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1000 may include an identity management module 1028 that is configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
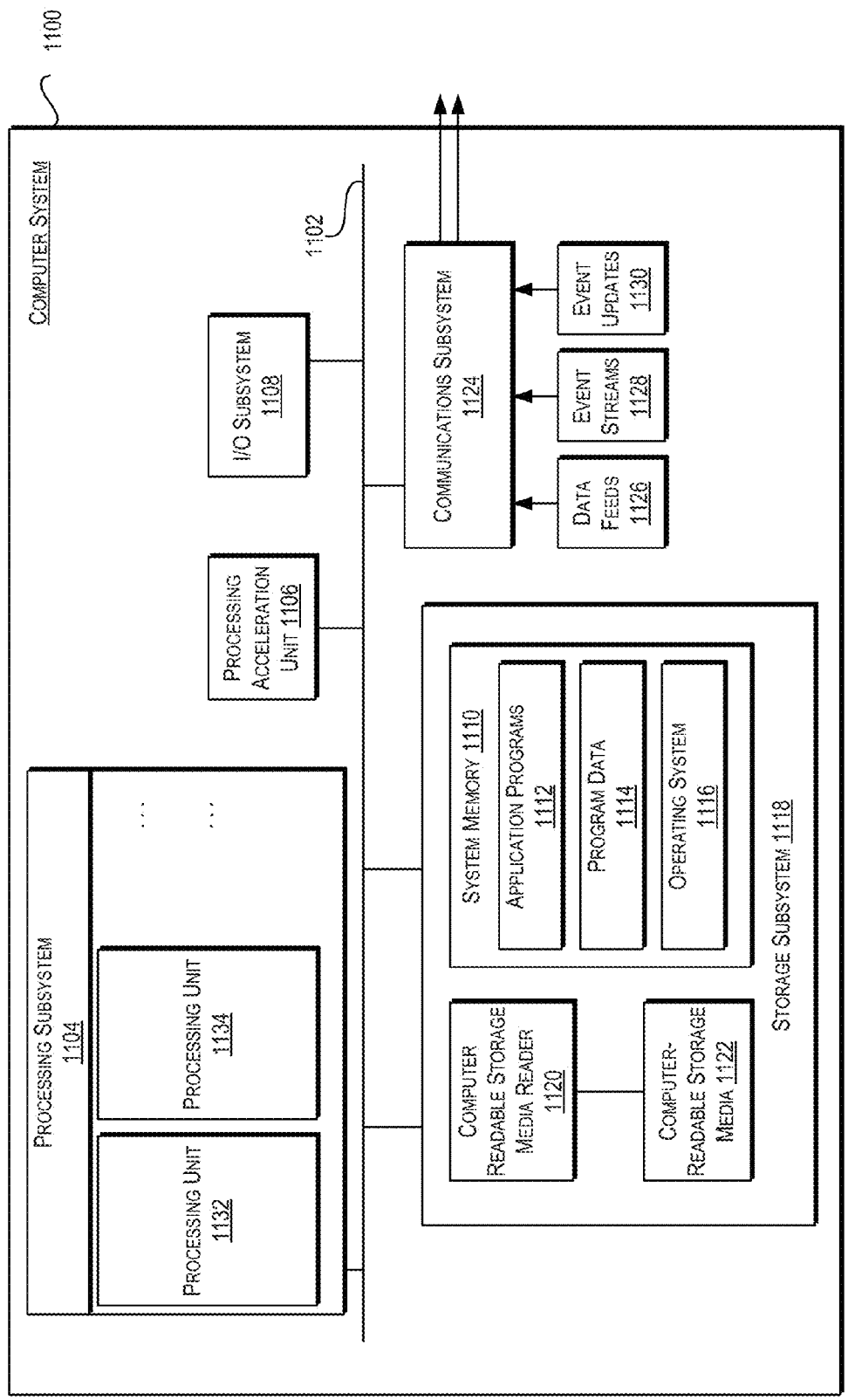
FIG. 11 illustrates an exemplary computer system that may be used to implement an embodiment of the present invention.

FIG. 11 illustrates an exemplary computer system 1100 that may be used to implement an embodiment of the present invention. In some embodiments, computer system 1100 may be used to implement any of the various servers and computer systems described above. As shown in FIG. 11, computer system 1100 includes various subsystems including a processing subsystem 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processing units 1132, 1134, etc. A processing unit may include be one or more processors, including single core or multicore processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1110 including potentially on one or more storage devices. Through suitable programming, processing subsystem 1104 can provide various functionalities described above for dynamically modifying documents (e.g., webpages) responsive to usage patterns.

In certain embodiments, a processing acceleration unit 1106 may be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with the present invention.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that when executed by processing subsystem 1104 a processor provide the functionality described above may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:

receiving, by a computing system implementing a messaging system, from a first source system, a first plurality of messages to be sent to a first target system, the first plurality of messages comprising at least a first message and a second message, the first message being received by the computing system prior to the second message;

receiving, by the computer system, from a second source system, a second plurality of messages to be sent to a second target system, the second plurality of messages comprising at least a third and a fourth message;

maintaining, by the computing system, a first plurality of memory queues for the first target system, the first plurality of memory queues including a first message sequencing queue, first a message status queue, and a first dispatch queue;

adding, by the computing system to the first message sequencing queue in the first plurality of memory queues, a first entry corresponding to the first message in the first plurality of messages and a second entry corresponding to the second message in the first plurality of messages, wherein an order of the entries in the first message sequencing queue is based at least in part on an order of receipt of the messages in the first plurality of messages;

maintaining, by the computing system in the first message status queue in the first plurality of memory queues, a first status entry for storing status information for the first entry in the first message sequencing queue in the first plurality of memory queues and a second status entry for storing status information for the second entry in the first message sequencing queue in the first plurality of memory queues;

determining, by the computing system, based upon the entries in the first message status queue of the first plurality of memory queues, that the second message is ready for transmission to the first target system;

determining, by the computing system, that the first message has not yet been transmitted by the computing system to the first target system;

responsive to determining that the first message has not yet been transmitted by the computing system to the first target system, adding, by the computing system to the first dispatch queue of the first plurality of memory queues, an entry corresponding to the second message;

transmitting, by the computing system using the first dispatch queue, the second message to the first target system after the first message has been transmitted to the first target system;
maintaining, by the computing system, a second plurality of memory queues for the second target system, the second plurality of memory queues including a second message sequencing queue, a second message status queue, and a second dispatch queue, the second plurality of memory queues being distinct from the first plurality of memory queues;
determining, by the computing system, based upon entries in the second message status queue of the second plurality of memory queues, that the fourth message is ready for transmission to the second target system;
determining, by the computing system, that the third message has not yet been transmitted by the computing system to the second target system;
adding, by the computing system to the second dispatch queue of the second plurality of memory queues, an entry corresponding to the fourth message; and
transmitting, by the computing system using the second dispatch queue, the fourth message to the second target system after the third message has been transmitted to the second target system.

2. The method of claim 1, further comprising:
processing, by the computing system, the first plurality of messages, wherein an order of processing of the first plurality of messages to be ready for transmission to the first target system is independent of an order of receipt of the first plurality of messages; and
updating, based at least on the order of processing the first plurality of messages, by the computing system, first the message status queue.

3. The method of claim 2, wherein the first plurality of messages are processed in parallel.

4. The method of claim 2, wherein the second message is processed at a first time and the first message is processed at a second time, the second time being after the first time;
updating by, the computing system, the first status entry at the second time; and
updating, by the computing system, the second status entry at the first time.

5. The method of claim 4, wherein the first message sequencing queue and the first message status queue are stored in a shared memory cache subsystem of the computing system.

6. The method of claim 5, wherein the shared memory cache subsystem comprises one or more Coherence caches.

7. The method of claim 1, wherein an order of processing of the first plurality of messages to be ready for transmission to the first target system and the second plurality of messages to be ready for transmission to the second target system is independent of an order of receipt of the first plurality of messages and the second plurality of messages.

8. The method of claim 1, wherein the fourth message is processed to be ready for transmission to the second target system before the first message is processed to be ready for transmission to the first target system.

9. A system implementing a messaging system, the system comprising:
a memory; and
one or more processors coupled to the memory, wherein the one or more processors are configurable to:
receive, from a first source system, a first plurality of messages to be sent to a first target system, the first plurality of messages comprising at least a first message and a second message, the first message being received prior to the second message;
receive, from a second source system, a second plurality of messages to be sent to a second target system, the second plurality of messages comprising at least a third and a fourth message;
maintain a first plurality of memory queues for the first target system, the first plurality of memory queues including a first message sequencing queue, a first message status queue, and a first dispatch queue;
add, to the first message sequencing queue in the first plurality of memory queues, a first entry corresponding to the first message in the first plurality of messages and a second entry corresponding to the second message in the first plurality of messages, wherein an order of the entries in the first message sequencing queue is based at least in part on an order of receipt of the messages in the first plurality of messages;
maintain, in the first message status queue in the first plurality of memory queues, a first status entry for storing status information for the first entry in the first message sequencing queue in the first plurality of memory queues and a second status entry for storing status information for the second entry in the first message sequencing queue in the first plurality of memory queues;
determine, based upon the entries in the first message status queue of the first plurality of memory queues, that the second message is ready for transmission to the first target system;
determine that the first message has not yet been transmitted to the first target system;
responsive to determining that the first message has not yet been transmitted to the first target system, add, to the first dispatch queue of the first plurality of memory queues, an entry corresponding to the second message;
transmit, using the first dispatch queue, the second message to the first target system after the first message has been transmitted to the first target system;
maintain a second plurality of memory queues for the second target system the second plurality of memory queues including a second message sequencing queue, a second message status queue, and a second dispatch queue, the second plurality of memory queues being distinct from the first plurality of memory queues;
determine, based upon entries in the second message status queue of the second plurality of memory queues, that the fourth message is ready for transmission to the second target system;
determine that the third message has not yet been transmitted to the second target system;
add, to the second dispatch queue of the second plurality of memory queues, an entry corresponding to the fourth message; and
transmitting, using the second dispatch queue, the fourth message to the second target system after the third message has been transmitted to the second target system.

10. The system of claim 9, wherein the one or more processors are configurable to:
process the first plurality of messages, wherein an order of processing of the first plurality of messages to be ready for transmission to the first target system is independent of an order of receipt of the first plurality of messages; and
updating, based at least on the order of processing the first plurality of messages, the first message status queue.

11. The system of claim 9, wherein an order of processing of the first plurality of messages to be ready for transmission to the first target system and the second plurality of messages to be ready for transmission to the second target system is independent of an order of receipt of the first plurality of messages and the second plurality of messages.

12. The system of claim 9, wherein the fourth message is processed to be ready for transmission to the second target system before the first message is processed to be ready for transmission to the first target system.

13. A non-transitory computer-readable media storing computer-executable instructions executable by one or more processors, the computer-executable instructions comprising:
- instructions that cause the one or more processors to receive, from a first source, a first plurality of messages to be sent to a first target system, the first plurality of messages comprising at least a first message and a second message, the first message being received prior to the second message;
- instructions that cause the one or more processors to receive, from a second source system, a second plurality of messages to be sent to a second target system, the second plurality of messages comprising to least a third and a fourth message;
- instructions that cause the one or more processors to maintain a first plurality of memory queues for the first target system, the first plurality of memory queues including a first message sequencing queue, a first message status queue, and a first dispatch queue;
- instructions that cause the one or more processors to add, to the first message sequencing queue in the first plurality of memory queues, a first entry corresponding to the first message in the first plurality of messages and a second entry corresponding to the second message in the first plurality of messages, wherein an order of the entries in the first message sequencing queue is based at least in part on an order of receipt of the messages in the first plurality of messages;
- instructions that cause the one or more processors to maintain, in the first message status queue in the first plurality of memory queues, a first status entry for storing status information for the first entry in the first message sequencing queue in the first plurality of memory queues and a second status entry for storing status information for the second entry in the first message sequencing queue in the first plurality of memory queues;
- instructions that cause the one or more processors to determine, based upon the entries in the first message status queue of the first plurality of memory queues, that the second message is ready for transmission to the first target system;
- instructions that cause the one or more processors to determine that the first message has not yet been transmitted to the first target system;
- instructions that cause the one or more processors to, responsive to determining that the first message has not yet been transmitted to the first target system, add, to the first dispatch queue of the first plurality of memory queues, an entry corresponding to the second message;
- instructions that cause the one or more processors to transmit, using the first dispatch queue, the second message to the first target system after the first message has been transmitted to the first target system;
- instructions that cause the one or more processors to maintain a second plurality of memory queues for the second target system the second plurality of memory queues including a second message sequencing queue, a second message status queue, and a second dispatch queue, the second plurality of memory queues being distinct from the first plurality of memory queues;
- instructions that cause the one or more processors to determine, based upon entries in the second message status queue of the second plurality of memory queues, that the fourth message is ready for transmission to the second target system;
- instructions that cause the one or more processors to determine that the third message has not yet been transmitted to the second target system;
- instructions that cause the one or more processors to add, to the second dispatch queue of the second plurality of memory queues, an entry corresponding to the fourth message; and
- instructions that cause the one or more processors to transmitting, using the second dispatch queue, the fourth message to the second target system after the third message has been transmitted to the second target system.

14. The non-transitory computer-readable media of claim 13, the instructions further comprising instructions that cause the one or more processors to process the first plurality of messages, wherein an order of processing of the first plurality of messages to be ready for the transmission to the first target system is independent of an order of receipt of the first plurality of messages; and
- updating, based at least on the order of processing the first plurality of messages, the message status queue.

15. The non-transitory computer-readable media of claim 13, wherein the first message sequencing queue and the first message status queue are stored in a shared memory cache subsystem.

* * * * *

UNITED STATES PATENT AND TRADEMARK OFFICE
CERTIFICATE OF CORRECTION

PATENT NO. : 10,244,070 B2
APPLICATION NO. : 15/006963
DATED : March 26, 2019
INVENTOR(S) : Swain et al.

Page 1 of 1

It is certified that error appears in the above-identified patent and that said Letters Patent is hereby corrected as shown below:

In the Specification

In Column 17, Line 55, delete "212)" and insert -- 212). --, therefor.

Signed and Sealed this
Third Day of November, 2020

Andrei Iancu
*Director of the United States Patent and Trademark Office*